US012591169B2

(12) United States Patent
Pittman

(10) Patent No.: US 12,591,169 B2
(45) Date of Patent: Mar. 31, 2026

(54) REMOTELY CONTROLLABLE MOBILE VIDEO STUDIO WITH INTEGRATED TELEPROMPTER, CAMERA, LIGHTING AND MICROPHONE

(71) Applicant: Matthew Pittman, Missoula, MT (US)

(72) Inventor: Matthew Pittman, Missoula, MT (US)

( * ) Notice: Subject to any disclaimer, the term of this patent is extended or adjusted under 35 U.S.C. 154(b) by 75 days.

(21) Appl. No.: 18/582,251

(22) Filed: Feb. 20, 2024

(65) Prior Publication Data

US 2025/0264787 A1    Aug. 21, 2025

(51) Int. Cl.
  *G03B 17/56*    (2021.01)
  *G03B 15/05*    (2021.01)
  *G03B 15/06*    (2021.01)

(52) U.S. Cl.
  CPC ........... *G03B 17/566* (2013.01); *G03B 15/05* (2013.01); *G03B 15/06* (2013.01); *G03B 17/561* (2013.01); *G03B 17/563* (2013.01); *G03B 2217/007* (2013.01)

(58) Field of Classification Search
  CPC ...... G03B 17/566; G03B 15/05; G03B 15/06; G03B 17/561; G03B 17/563; G03B 2217/007
  USPC ........................................ 348/375
  See application file for complete search history.

(56) References Cited

U.S. PATENT DOCUMENTS

| | | |
|---|---|---|
| 9,060,125 B2 | 6/2015 | Mueller et al. |
| 9,465,278 B2 | 10/2016 | Lytle |
| 9,549,609 B2 | 1/2017 | Constantino et al. |
| 10,171,734 B2 | 1/2019 | Mueller et al. |
| 10,272,848 B2 | 4/2019 | Troxel |
| 10,808,879 B2 | 10/2020 | Okumura et al. |
| 11,533,421 B2 | 12/2022 | Rosensweig et al. |
| 2002/0168189 A1* | 11/2002 | Mulcahy .............. G03B 17/561 396/422 |
| 2006/0132594 A1 | 6/2006 | Parsons |

(Continued)

FOREIGN PATENT DOCUMENTS

| | | |
|---|---|---|
| CN | 05912149 U | 1/2017 |
| CN | 214618572 U | 11/2021 |

(Continued)

*Primary Examiner* — Usman A Khan
(74) *Attorney, Agent, or Firm* — McConnell Law Firm PC; Robert McConnell

(57) ABSTRACT

A mobile video studio with all the required components to produce high-quality video content in any format, aspect ratio and resolution (Ultra high definition, high definition and others), including cameras, lights, tablet computers or displays, microphones, battery packs, dummy batteries, video capture cards, internet connectivity devices, speakers, a tripod, and brackets, heads, support and rigging to support all the above equipment in multiple configurations for multiple types of video output. The mobile video studio may be used remotely, without a local production crew, and in some embodiments, in combination with a floor grid. Remote video conferencing software may be utilized to enable a remote crew or collaborators to assist with production.

The mobile video studio fits in a shipping safe travel case configured specifically to safely fit each piece of equipment within a cushioned compartment. The travel case is safe to be shipped or carried on a commercial flight.

35 Claims, 37 Drawing Sheets

| Reference Number | Item |
|---|---|
| 100 | Mobile Video Studio |
| 105 | Tripod Shoes |
| 109 | Tripod |
| 125 | First Light |
| 127 | Second Light |
| 129 | Microphone |
| 131 | Tablet |
| 132 | First Camera |
| 133 | Speaker |
| 134 | Camera Cage |
| 135 | Horizontal Bracket |
| 156 | Second Camera |
| 157 | Microphone shoe |
| 158 | Tripod Head |
| 162 | Cage Receiver |
| 177 | Video Capture Card |

(56) References Cited

U.S. PATENT DOCUMENTS

| | | | | |
|---|---|---|---|---|
| 2007/0273327 | A1* | 11/2007 | Daniel | H01M 50/559 |
| | | | | 320/110 |
| 2011/0129210 | A1* | 6/2011 | McGucken | G03B 17/561 |
| | | | | 705/26.5 |
| 2013/0279895 | A1* | 10/2013 | Tirmenstein | G03B 15/05 |
| | | | | 362/18 |
| 2015/0351510 | A1* | 12/2015 | Zwetzig | A45C 11/38 |
| | | | | 206/316.2 |
| 2019/0384143 | A1 | 12/2019 | Lynch et al. | |
| 2021/0132477 | A1* | 5/2021 | Holland | H04N 5/222 |
| 2021/0181610 | A1 | 6/2021 | Guo et al. | |
| 2021/0291067 | A1* | 9/2021 | Hirose | A63H 17/262 |
| 2023/0152674 | A1 | 5/2023 | Tonokawa et al. | |
| 2023/0175643 | A1 | 6/2023 | Bustamante | |
| 2023/0247176 | A1 | 8/2023 | Kita | |

FOREIGN PATENT DOCUMENTS

| | | | |
|---|---|---|---|
| DE | 202011005011 | U1 | 10/2011 |
| DE | 202014010075 | U1 | 3/2015 |
| DE | 202014010075 | | 4/2015 |
| EP | 2185855 | B1 | 5/2010 |
| KR | 1020170059879 | | 5/2017 |

* cited by examiner

| Reference Number | Item |
|---|---|
| 100 | Mobile Video Studio |
| 106 | Tripod Shoes |
| 109 | Tripod |
| 125 | First Light |
| 127 | Second Light |
| 129 | Microphone |
| 131 | Tablet |
| 132 | First Camera |
| 133 | Speaker |
| 134 | Camera Cage |
| 135 | Horizontal Bracket |
| 156 | Second Camera |
| 157 | Microphone shoe |
| 158 | Tripod Head |
| 162 | Cage Receiver |
| 177 | Video Capture Card |

| Reference Number | Item |
|---|---|
| 102 | Upper Bracket Jaw |
| 104 | Battery |
| 105 | Accessory Bracket |
| 106 | Tripod Shoe |
| 107 | Lower Bracket Jaw |
| 108 | Tripod Top |
| 109 | Tripod |
| 111 | Locking Collar |
| 112 | Lock Screw |
| 115 | Tripod First Segment |
| 117 | Tripod Second Segment |

| Reference Number | Item |
|---|---|
| 102 | Upper Bracket Jaw |
| 104 | Battery |
| 105 | Accessory Bracket |
| 106 | Tripod Shoe |
| 107 | Lower Bracket Jaw |
| 108 | Tripod Top |
| 109 | Tripod |
| 111 | Locking Collar |
| 112 | Lock Screw |
| 115 | Tripod First Segment |
| 117 | Tripod Second Segment |
| 118 | Battery Bracket |
| 120 | Bracket Adjustment Screw |
| 121 | Upper Battery Bracket Arm |
| 122 | Lower Battery Bracket Arm |

| Reference Number | Item |
|---|---|
| 102 | Upper Bracket Jaw |
| 104 | Battery |
| 105 | Accessory Bracket |
| 106 | Tripod Shoe |
| 107 | Lower Bracket Jaw |
| 108 | Tripod Top |
| 109 | Tripod |
| 111 | Locking Collar |
| 112 | Lock Screw |
| 115 | Tripod First Segment |
| 117 | Tripod Second Segment |
| 118 | Battery Bracket |
| 120 | Bracket Adjustment Screw |
| 121 | Upper Battery Bracket Arm |
| 122 | Lower Battery Bracket Arm |

| Reference Number | Item |
|---|---|
| 102 | Upper Bracket Jaw |
| 105 | Accessory Bracket |
| 106 | Tripod Shoe |
| 107 | Lower Bracket Jaw |
| 108 | Tripod Top |
| 109 | Tripod |
| 111 | Locking Collar |
| 112 | Lock Screw |
| 115 | Tripod First Segment |
| 117 | Tripod Second Segment |
| 125 | Light |
| 126 | Diffuser |

| Reference Number | Item |
|---|---|
| 102 | Upper Bracket Jaw |
| 104 | Battery |
| 105 | Accessory Bracket |
| 106 | Tripod Shoe |
| 107 | Lower Bracket Jaw |
| 108 | Tripod Top |
| 109 | Tripod |
| 111 | Locking Collar |
| 112 | Lock Screw |
| 115 | Tripod First Segment |
| 117 | Tripod Second Segment |
| 118 | Battery Bracket |
| 120 | Bracket Adjustment Screw |
| 121 | Upper Battery Bracket Arm |
| 122 | Lower Battery Bracket Arm |
| 125 | Light |
| 126 | Diffuser |

| Reference Number | Item |
|---|---|
| 105 | Accessory Bracket |
| 106 | Tripod Shoe |
| 125 | First Light |
| 126 | Diffuser |
| 127 | Second Light |

| Reference Number | Item |
|---|---|
| 104 | Battery |
| 105 | Accessory Bracket |
| 106 | Tripod Shoe |
| 108 | Tripod Top |
| 118 | Battery Bracket |
| 121 | Upper Battery Bracket Arm |
| 122 | Lower Battery Bracket Arm |
| 125 | Light |
| 126 | Diffuser |
| 127 | Second Light |

| Reference Number | Item |
|---|---|
| 106 | Tripod Shoe |
| 112 | Lock Screw |
| 125 | Light |
| 126 | Diffuser |
| 129 | Microphone |
| 131 | Tablet |
| 132 | First Camera |
| 133 | Speaker |
| 134 | Camera Cage |
| 157 | Microphone Shoe |
| 162 | Camera Cage Receiver |
| 177 | Video Capture Card |

| Reference Number | Item |
|---|---|
| 104 | Battery |
| 105 | Accessory Bracket |
| 106 | Tripod Shoe |
| 108 | Tripod Top |
| 109 | Tripod |
| 112 | Lock Screw |
| 118 | Battery Bracket |
| 121 | Upper Battery Bracket Arm |
| 122 | Lower Battery Bracket Arm |
| 125 | Light |
| 126 | Diffuser |
| 129 | Microphone |
| 131 | Tablet |
| 132 | First Camera |
| 133 | Speaker |
| 134 | Camera Cage |
| 157 | Microphone Shoe |
| 162 | Camera Cage Receiver |
| 177 | Video Capture Card |

| Reference Number | Item |
|---|---|
| 104 | Battery |
| 105 | Accessory Bracket |
| 106 | Tripod Shoe |
| 108 | Tripod Top |
| 109 | Tripod |
| 112 | Lock Screw |
| 118 | Battery Bracket |
| 125 | Light |
| 129 | Microphone |
| 131 | Tablet |
| 133 | Speaker |
| 136 | Light Shoe |
| 138 | Network Connection |
| 157 | Microphone Shoe |

| Reference Number | Item |
|---|---|
| 106 | Tripod Shoe |
| 108 | Tripod Top |
| 109 | Tripod |
| 112 | Lock Screw |
| 118 | Battery Bracket |
| 125 | Light |
| 129 | Microphone |
| 131 | Tablet |
| 132 | First Camera |
| 133 | Speaker |
| 136 | Light Shoe |
| 138 | Network Connection |
| 157 | Microphone Shoe |
| 162 | Camera Cage Receiver |
| 177 | Video Capture Card |

| Reference Number | Item |
|---|---|
| 106 | Tripod Shoe |
| 108 | Tripod Top |
| 109 | Tripod |
| 112 | Lock Screw |
| 118 | Battery Bracket |
| 125 | Light |
| 126 | Diffuser |
| 129 | Microphone |
| 131 | Tablet |
| 132 | First Camera |
| 133 | Speaker |
| 134 | Camera Cage |
| 157 | Microphone Shoe |
| 162 | Camera Cage Receiver |

| Reference Number | Item |
|---|---|
| 105 | Accessory Bracket |
| 106 | Tripod Shoe |
| 112 | Lock Screw |
| 125 | Light |
| 126 | Diffuser |
| 127 | Second Light |
| 129 | Microphone |
| 131 | Tablet |
| 132 | First Camera |
| 133 | Speaker |
| 134 | Camera Cage |
| 135 | Horizontal Bracket |
| 157 | Microphone Shoe |
| 162 | Camera Cage Receiver |
| 177 | Video Capture Card |

| Reference Number | Item |
|---|---|
| 104 | Battery |
| 105 | Accessory Bracket |
| 106 | Tripod Shoe |
| 112 | Lock Screw |
| 118 | Battery Bracket |
| 125 | Light |
| 127 | Second Light |
| 129 | Microphone |
| 131 | Tablet |
| 132 | First Camera |
| 133 | Speaker |
| 134 | Camera Cage |
| 135 | Horizontal Bracket |
| 138 | Network Connection |
| 157 | Microphone Shoe |
| 162 | Camera Cage Receiver |
| 177 | Video Capture Card |

| Reference Number | Item |
|---|---|
| 105 | Accessory Bracket |
| 106 | Tripod Shoe |
| 109 | Tripod |
| 112 | Lock Screw |
| 125 | Light |
| 126 | Diffuser |
| 127 | Second Light |
| 129 | Microphone |
| 131 | Tablet |
| 132 | First Camera |
| 133 | Speaker |
| 134 | Camera Cage |
| 135 | Horizontal Bracket |
| 156 | Second Camera |
| 157 | Microphone Shoe |
| 162 | Camera Cage Receiver |
| 177 | Video Capture Card |

| Reference Number | Item |
|---|---|
| 125 | Light |
| 126 | Diffuser |
| 136 | Light Shoe |
| 137 | Shoe Connector |

| Reference Number | Item |
|---|---|
| 125 | Light |
| 126 | Diffuser |
| 136 | Light Shoe |
| 137 | Shoe Connector |
| 138 | Network Connection |

| Reference Number | Item |
|---|---|
| 132 | Camera |
| 134 | Camera Cage |
| 140 | Cage Release |
| 141 | Camera Lens |
| 142 | Wide Angle Lens |
| 162 | Wireless Camera Cage Receiver |
| 178 | Level |

| Reference Number | Item |
|---|---|
| 132 | Camera |
| 134 | Camera Cage |
| 140 | Cage Release |
| 141 | Camera Lens |
| 162 | Wireless Camera Cage Receiver |
| 178 | Level |

143

| Reference Number | Item |
|---|---|
| 143 | Carrying Case |

| Reference Number | Item |
|---|---|
| 109 | Tripod |
| 125 | First Light |
| 129 | Microphone |
| 131 | Tablet |
| 132 | First Camera |
| 143 | Carrying Case |
| 144 | Cushion Material |
| 146 | Dividers |
| 156 | Second Camera |

134

150

151

149

148

| Reference Number | Item |
|---|---|
| 106 | Tripod Shoe |
| 134 | Camera Cage |
| 148 | Screw Post |
| 149 | Second Cage Connector |
| 150 | First Cage Connector |
| 151 | Lens Opening |

| Reference Number | Item |
|---|---|
| 134 | Camera Cage |
| 148 | Screw Post |
| 149 | Second Cage Connector |
| 150 | First Cage Connector |
| 151 | Lens Opening |
| 160 | First Cage Shoe |

153

154

148

152

| Reference Number | Item |
|---|---|
| 148 | Connector Plate |
| 152 | Ball Tripod Head |
| 153 | Ball Connector |
| 154 | Lock Knob |

161

106                                                                                                                106

155                                                                  155

| Reference Number | Item |
|---|---|
| 106 | Tripod Shoe |
| 155 | Release Button |
| 161 | Dual Slider Plate |

| Reference Number | Item |
|---|---|
| 132 | First Camera |
| 134 | Camera Cage |
| 148 | Screw Post |
| 149 | Second Cage Connector |
| 150 | First Cage Connector |
| 151 | Lens Opening |
| 152 | Ball Tripod Head |
| 160 | First Cage Shoe |
| 178 | Level |

| Reference Number | Item |
|---|---|
| 132 | First Camera |
| 134 | Camera Cage |
| 148 | Screw Post |
| 149 | Second Cage Connector |
| 150 | First Cage Connector |
| 151 | Lens Opening |
| 152 | Ball Tripod Head |
| 154 | Lock Knob |
| 160 | First Cage Shoe |
| 173 | Second Cage Shoe |
| 178 | Level |

| Reference Number | Item |
|---|---|
| 106 | Tripod Shoe |
| 132 | First Camera |
| 134 | Camera Cage |
| 148 | Screw Post |
| 152 | Ball Tripod Head |
| 154 | Lock Knob |
| 160 | First Cage Shoe |

| Reference Number | Item |
|---|---|
| 106 | Tripod Shoe |
| 132 | First Camera |
| 134 | Camera Cage |
| 148 | Screw Post |
| 151 | Lens Opening |
| 152 | Ball Tripod Head |
| 160 | First Cage Shoe |
| 173 | Second Cage Shoe |
| 174 | Grip |
| 178 | Level |

| Reference Number | Item |
|---|---|
| 106 | Tripod Shoe |
| 132 | First Camera |
| 134 | Camera Cage |
| 148 | Screw Post |
| 151 | Lens Opening |
| 152 | Ball Tripod Head |
| 160 | First Cage Shoe |
| 173 | Second Cage Shoe |
| 173 | Second Cage Shoe |
| 174 | Grip |
| 175 | Grip Coupling |
| 178 | Level |

| Reference Number | Item |
|---|---|
| 106 | Tripod Shoe |
| 132 | First Camera |
| 134 | Camera Cage |
| 148 | Screw Post |
| 152 | Ball Tripod Head |
| 160 | First Cage Shoe |
| 174 | Grip |
| 175 | Grip Coupling |

| Reference Number | Item |
|---|---|
| 132 | First Camera |
| 134 | Camera Cage |
| 162 | Wireless Camera Cage Receiver |
| 174 | Grip |
| 175 | Grip Coupling |
| 176 | User's Hand |

| Reference Number | Item |
|---|---|
| 125 | First Light |
| 132 | First Camera |
| 134 | Camera Cage |
| 151 | Lens Opening |
| 162 | Wireless Camera Cage Receiver |
| 162 | Wireless Camera Cage Receiver |
| 174 | Grip |
| 175 | Grip Coupling |
| 176 | User's Hand |

163

167

166

165

164

| Reference Number | Item |
|---|---|
| 163 | Floor Grid |
| 164 | First Position |
| 165 | Second Position |
| 166 | Third Position |
| 167 | Fourth Position |

| Reference Number | Item |
|---|---|
| 163 | Floor Grid |
| 164 | First Position |
| 165 | Second Position |
| 166 | Third Position |
| 167 | Fourth Position |
| 168 | Presenter |
| 169 | First Tripod |
| 170 | Second Tripod |

| Reference Number | Item |
|---|---|
| 163 | Floor Grid |
| 164 | First Position |
| 165 | Second Position |
| 166 | Third Position |
| 167 | Fourth Position |
| 168 | Presenter |
| 169 | First Tripod |
| 170 | Second Tripod |
| 171 | First Camera Setup |
| 172 | Second Camera Setup |

REMOTELY CONTROLLABLE MOBILE VIDEO STUDIO WITH INTEGRATED TELEPROMPTER, CAMERA, LIGHTING AND MICROPHONE

BACKGROUND OF THE INVENTION

Field of the Invention

There is significant need for production of high-quality video content in any format, aspect ratio and resolution (Ultra high definition, high definition and others) for use on the internet and TV, however the cost of the professional production team to make such videos is prohibitively high for many types of projects. The cost for a professional production team includes not only the personnel costs but may also require other significant expenses such as pre-production crew, software, logistics preparation, equipment expense, travel expenses such as transportation and accommodations, and locations. In the alternative, videos made by non-professionals, with single mobile phones or web cameras, without lighting and professional sound, are generally poor quality. There is a need for a mobile video studio that is portable and easy to set up for someone who is not a video production professional. This type of mobile studio should create high-quality video content in any format, aspect ratio and resolution (Ultra high definition, high definition and others) and be remotely operable by professionals in another location. This mobile studio should be configurable to allow multiple camera, lighting, microphone and teleprompter setups that allow different types of video content to be captured. This type of mobile video studio should be able to be shipped to a remote location for use by a non-professional to create high-quality video content in any format, aspect ratio and resolution (Ultra high definition, high definition and others).

The present invention relates to a mobile video studio that includes equipment for creating high-quality video content in any format, aspect ratio and resolution (Ultra high definition, high definition and others), specifically camera(s), microphone(s), lights(s), tablet computer(s) and tripod/structural equipment to support the various pieces of equipment in various configurations ideal for use by a single person. This mobile studio setup is compact, portable and may be stored in an included case specially designed for the various pieces of equipment. This case may be shipped to remote locations allowing the mobile studio to be portable without a professional crew, lowering production cost significantly.

The mobile video studio of the present invention includes multiple cameras, lights, light diffusers, tablet computers, microphones and a configurable tripod. The mobile video studio also includes various heads, brackets and rigs that allow the cameras, lighting, microphones and tablet computers to be set in various configurations that allow the creation of various types of video content. Also included are battery packs, WiFi/internet connectivity devices and speakers. The mobile video studio may be controlled locally by the user or through the internet by a remote user. The mobile video studio enables high-quality video production without an expensive on-site crew. Additionally, the mobile video studio also allows for real-time audio and video feedback from remote crew members or participants. The mobile video studio allows remote production team members to attend the remote shoot in real-time without the time and financial cost of travel to the location.

SUMMARY OF THE INVENTION

The mobile video studio of the present invention includes all the required components to produce high-quality video content in any format, aspect ratio and resolution (Ultra high definition, high definition and others) without a professional crew and, if desired, from a remote location. The mobile video studio may comprise 1) one or more cameras, 2) one or more lights, with or without diffusers, 3) one or more tablet computers or displays, 4) one or more microphones, 5) one or more battery packs, 6) one or more internet connectivity devices, 7) one or more speakers, 8) a tripod, and 9) brackets, heads, support and rigging to support all the above equipment in multiple configurations for multiple types of video output.

All the equipment listed above fits in a shipping safe travel case configured specifically to safely fit each piece of equipment within a cushioned compartment. This travel case may be shipped through typical shipping carriers such as FedEx™, UPS™, USPS™, DHL™ or may be carried on as luggage on a commercial airline flight. Due to the construction and configuration of the case, the equipment contained within will be safe, even if the travel case is subjected to strong external forces such as being dropped, thrown or jostled.

The mobile video studio includes one or more tablet computers or other display devices that may be used for remote communication using video conferencing services such as Zoom™, Microsoft Teams™, WebEx™ or Slack™. These tablet computers may also be used as a teleprompter with text to be read by the video subject while on camera. The location and configuration of the tablet computers is optimized such that use as a teleprompter results in the subject facing the camera in a natural manner while still reading from the prompter.

The mobile video studio also includes one or more cameras and one or more lights that can be utilized in multiple configurations allowing various types of footage to be created. Further, one or more microphones may be used with the setup to capture broadcast-quality professional sound. Lastly, the studio may also include a speaker for sound from remote locations such as through video conferencing applications.

Lastly, the mobile video studio includes a tripod and multiple tripod heads, brackets and rigs that allow the studio to be used with the various cameras, lights, tablet computers, microphones and speakers included with the setup. The tripods and various supports may be assembled in configurations that support a single camera or multiple cameras, a single tablet or two tablets, or one or more lights.

DESCRIPTION OF THE PREFERRED EMBODIMENT

The following detailed description refers to the preferred embodiment of the disclosed invention as shown in the attached figures and in the below description. This detailed description is not meant to limit the scope of the invention in any way but is intended to disclose the preferred embodiment/best mode of the invention at the time of filing this application.

The present invention is a mobile video studio comprising 1) one or more cameras, 2) one or more lights, with or without diffusers, 3) one or more tablet computers or displays, 4) one or more microphones, 5) one or more battery packs, 6) one or more internet connectivity devices, 7) one or more speakers, 8) a tripod, 9) heads/ball mounts, and 10) brackets, support and rigging to support all the above equipment in multiple configurations for multiple types of video output. The mobile video studio may also include a shipping safe travel case that allows the mobile studio equipment to be safely shipped or carried on a commercial airline. The various components and configurations will be described in relation to the figures described below.

Figure 1:
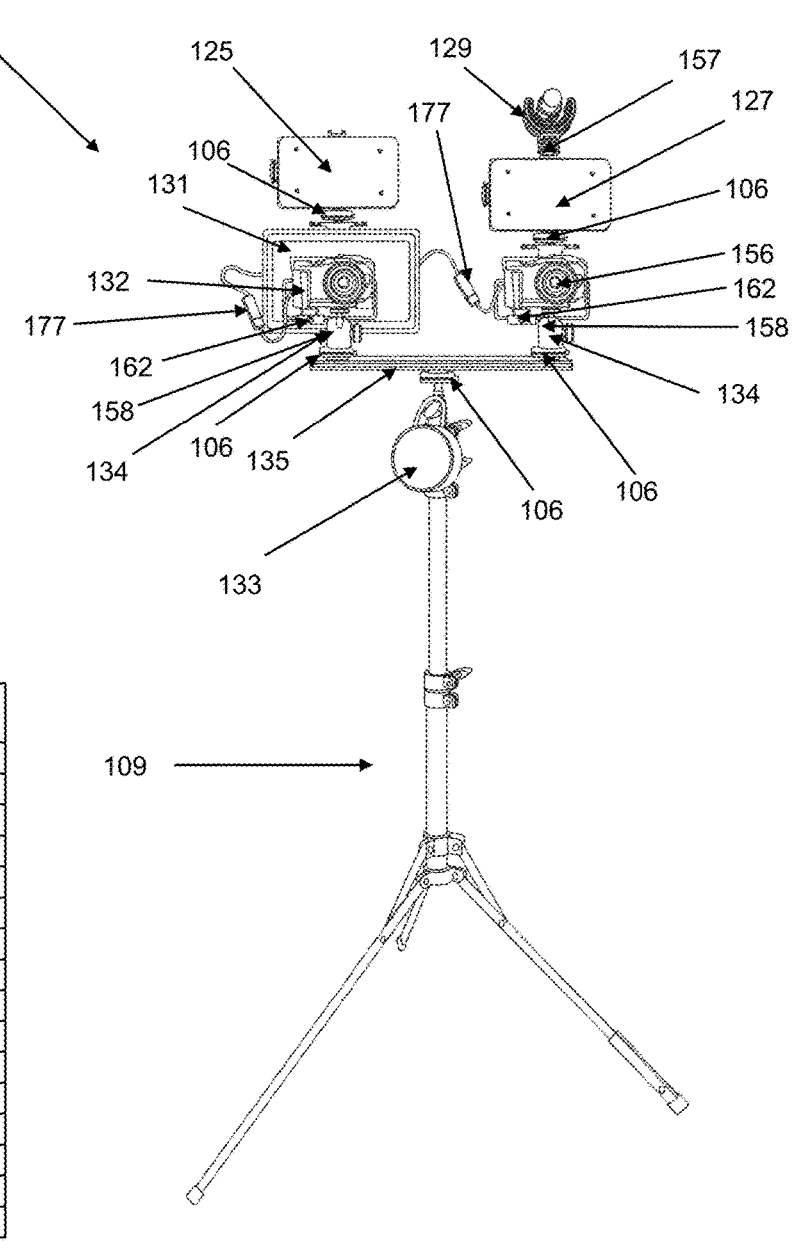
FIG. 1 is a front view of mobile video studio with horizontal bracket installed and with two cameras, two lights, a tablet and microphones.

FIG. 1 is a view of a configuration of mobile video studio 100. This configuration includes a first camera 132 and a second camera 156. Further, the configuration includes a first light 125 and a second light 127, coupled to tripod 109 with tripod shoes 106. Microphone 129 is utilized to capture sound for mobile video studio 100. Microphone 129 is mounted to the top of second light 127 with microphone shoe 157. Horizontal bracket 135 is secured to tripod 109 with another tripod shoe 106. Horizontal bracket 135 includes attachment points for two tripod shoes 106. Tripod shoe 106 is secured to horizontal bracket 135 enabling mobile video studio to slide left, right, and 360 degrees on horizontal bracket 135. These tripod shoes 106 couple to camera cages 134. Camera cages 134 hold and support each camera and are attached to the camera via a screw mount. Camera cages 134 further include a tripod head 158 that allows camera cage 134 to be positioned in various forward, aft and side to side positions.

Camera cage 134 couples to coupling device, in the preferred embodiment, tripod shoe 106, by use of complementary shaped hardware on each. Coupling device tripod shoe 106 includes an attachment bracket with two vertical sides, each vertical side coupled to the base of the tripod shoe 106 at a base end. The top end of the vertical side includes a horizontal top clip. The two vertical sides are arranged so there is a gap between the two top clips. These vertical sides and top clips form a horizontal channel with a generally rectangular shape. This channel is closed at one end and open at the opposite end. The open end includes a spring loaded locking mechanism, deactivated by pressing a button located on the shoe. When the button is pressed on the shoe, a locking tab is lowered into the shoe, allowing items to be slid in and out of the channel. When the button is not depressed, the locking tab is raised and blocks the open end. By this means, items are securely locked into the channel in both a vertical and horizontal manner. Items designed to be coupled to the coupling device tripod shoe 106 include a coupling end that is generally rectangular, to match the open channel of the tripod shoe 106. To couple an item to the tripod shoe 106, the user presses the button, slides the coupling end into the attachment bracket, slides the device to the bracket and allows the locking mechanism to activate by raising the locking tab. Industry standard tripod shoe 106 sizing is utilized in the preferred embodiment, but any sizing may be used in this invention. Camera cage 134 also includes a built in wireless camera cage receiver 162 which receives audio signals from a wireless microphone installed on the participant and can be used in combination with microphone 129. Signals from cage receiver 162 are fed into the audio port of the camera to be combined with the video signals captured by the camera.

Also shown in this configuration is tablet 131. Tablet 131 may be utilized to operate a video conferencing service such as Zoom™, Microsoft Teams™, WebEx™ or Slack™. It may also be utilized as a teleprompter displaying written materials to be read by the subject of the video. The written content may scroll at an appropriate speed such that new content is displayed at the correct speed and cadence for the reader. The scrolling of the teleprompter may be controlled locally or by a remote user. Lastly, speaker 133 is shown hanging from a base support structure, in the preferred embodiment, tripod 109. Speaker 133 may also be attached in any other way well known in the art, including hook and loop fasteners, tape, or other adhesive means.

First camera 132 and second camera 156 may be any digital camera well known in the art. In the preferred embodiment the Sony ZV1-E1 is used, but any suitable camera such as the Sony ZV-1 Mark II (or other cameras in the Sony ZV family), Canon EOS R50, Panasonic Lumix GH6, Fujifilm X-S20, Sony A7S Mark III, any compatible mirrorless, digital single lens reflex (DSLR), or other digital camera/video camera known in the art could be used. In the alternative, cameras found on mobile phones or tablet computers could be used, web cameras are also suitable.

First light 125 and second light 127 may be any light source well known in the art. In the preferred embodiment, a rectangular LED light, with a 10,000 mAh built in battery, 276 LEDs, a light spectrum from 3200-5600 k and a USB-C connector may be used. Any light source known in the art could be used including LED, ring light, fluorescent, incandescent or any other lighting type could be utilized.

In the preferred embodiment, tablet 131 is a ALLDO-CUBE 2-in-1 Tablet PC running Microsoft Windows™ 11. This tablet is 10.5 inches in size and works with TeamViewer, AnyDesk, Chrome Remote desktop or any other remote connectivity software well known in the art. Any suitable tablet computer could be used including those that run Linux™, Apple iOS™ or Google Android™ operating systems.

Microphone 129 may be any microphone suitable for video production, but in the preferred embodiment is Rode VideoMic GO II. A wireless microphone may also be utilized with the mobile studio such as Rode Wireless GO II. This configuration includes an audio LAV receiver attached to the mobile video studio. The audio LAV receiver is wirelessly connected to a wireless microphone transceiver attached to the participant (person who is on-camera). The audio LAV may be connected to the camera via an AUX (auxiliary) cable or any other suitable connection method. Any suitable microphone known in the art may also be used with the invention.

Two video capture cards 177 are shown in this view. Video capture card 177 is fitted between first camera 132 and tablet 131 also between second camera 156 and tablet 131. Video capture card 177 inputs a video signal from first camera 132 or second camera 156 and converts it to a video signal that may be processed by tablet 131. Specifically, video capture card 177 converts analog video signals output from the camera into a digital format for processing, live-streaming, recording and storing of the video and audio signals. The capture card used in this version of the invention connects to the tablet computer via USB/USB-C, while others may use PCI Express slots on the motherboard.

Video capture card 177 is coupled to a cable connected to the camera at one end via a male micro-HDMI cable which couples with a female micro-HDMI connector on the camera. At the second end, the cable includes a male HDMI output which connects to a female HDMI connector on video capture card 177. The video capture card 177 includes a male USB or USB-C connector that couples to a female USB-C connector on tablet 131. This configuration allows the user to select the camera as a USB or external camera in Zoom/Teams. While these cable configurations are discussed related to the preferred embodiment, any configuration known in the art of audio-video cables and input/output types may be used.

Video capture card 177 used in the preferred embodiment is 4K 60 Hz Guermok USB 3.0 HDMI to USB C Audio Capture Card. Any suitable video capture card known in the art may also be used with the invention. It is important to note that the camera can be accessed, controlled and streamed by means of a direct USB-C cable connection between the camera and the tablet computer without the use of the video capture card. The video capture card provides additional broadcasting and video recording capabilities that extend the opportunities for remote collaborators to participate in the video shoot.

The various components of the mobile video studio are connected by industry standard wiring that include interfaces such as USB-A, USB-B, USB-C, Lighting, Firewire, HDMI, Thunderbolt, SATA, 3.5 mm Audio Jack, Micro HDMI, Micro USB.

Figure 2:
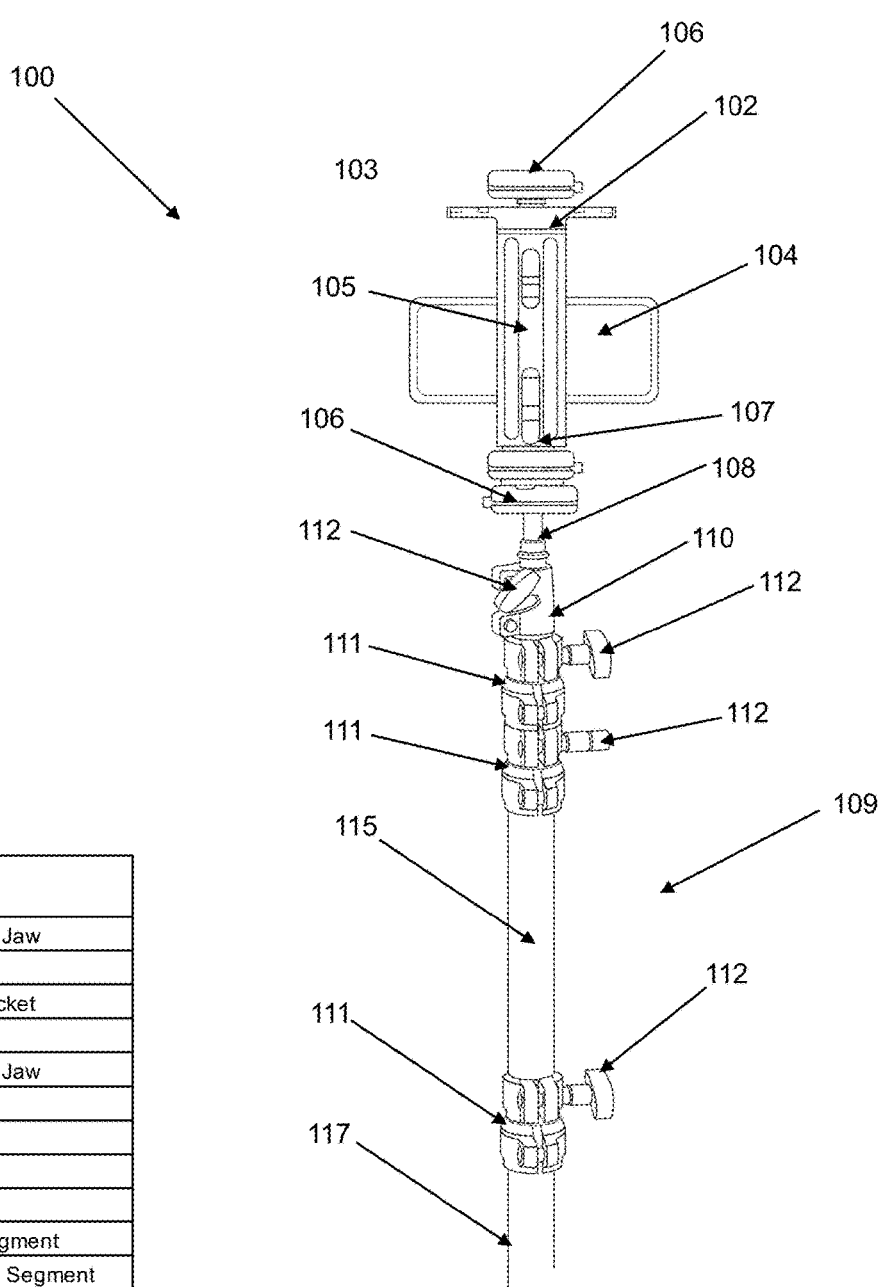
FIG. 2 is a front view of mobile video studio with battery installed.

FIG. 2 is a front view of mobile video studio 100 with the top of base support structure, in the preferred embodiment, tripod 109 visible and without camera, tablet or lights attached. Tripod 109 includes first segment 115 and second segment 117. Each segment may be extended with an additional internal segment that is controlled by locking collar 111. Locking collar 111 has two positions: 1) locked and 2) unlocked. In the locked position, lock screw 112 is tightened such pressure is applied to locking collar 111 and the extension of tripod segment 115 (or segment 117) is locked in place. In the unlocked position, lock screw is loosened and collar 111 no longer applies enough pressure to prevent movement of the extension of the tripod segment. In the unlocked position, the user may extend each tripod segment to increase or decrease the height of the tripod. Once a suitable position is achieved, the user may lock collar with lock screw 112 to fix the tripod height in one position.

Accessory bracket 105 is shown secured to tripod top 108 with coupling devices tripod shoes 106. Accessory bracket 105 includes upper bracket jaw 102 and lower bracket jaw 107 and may be used for securing a variety of accessories to the tripod including tablets, cameras, lights, batteries, Wifi devices and microphones. Battery 104 is secured to the rear of accessory bracket 105. Accessory bracket 105 includes a tripod shoe 106 above the upper bracket jaw 102 for attachment of various items such as lights, microphones, cameras or any other suitable item.

In the preferred embodiment, battery 104 is the evatronic Portable Charger 20000 mAh 60 W USB C fast charging. This particular battery 104 has the capability of charging tablet 131. While this battery is used in the preferred embodiment, any suitable rechargeable battery may be used including those of lithium ion, nickel metal hydride and nickel cadmium varieties. In combination with various batteries, dummy battery may be utilized. A dummy battery is a battery with a power adapter that fits into a battery slot located on the camera. A dummy battery is the same shape as a regular battery as it is designed to fit in the battery slot to replicate an actual battery. The dummy battery has a cable located at the end closest to the battery door of the camera. The dummy battery cable may be plugged into any power source including a wall plug, a USB outlet, or other power providing connection known in the art. In the preferred embodiment, the dummy battery fitted inside the camera body plugs into the USB outlet slot on the battery pack. In this configuration, the camera may remain powered for many hours without risk of overheating.

Also in the preferred embodiment, tripod 109 is the Manfrotto Nano Plus which can extend up to 6.5' (feet) but any suitable support structure and/or tripod may be utilized.

Figure 3:
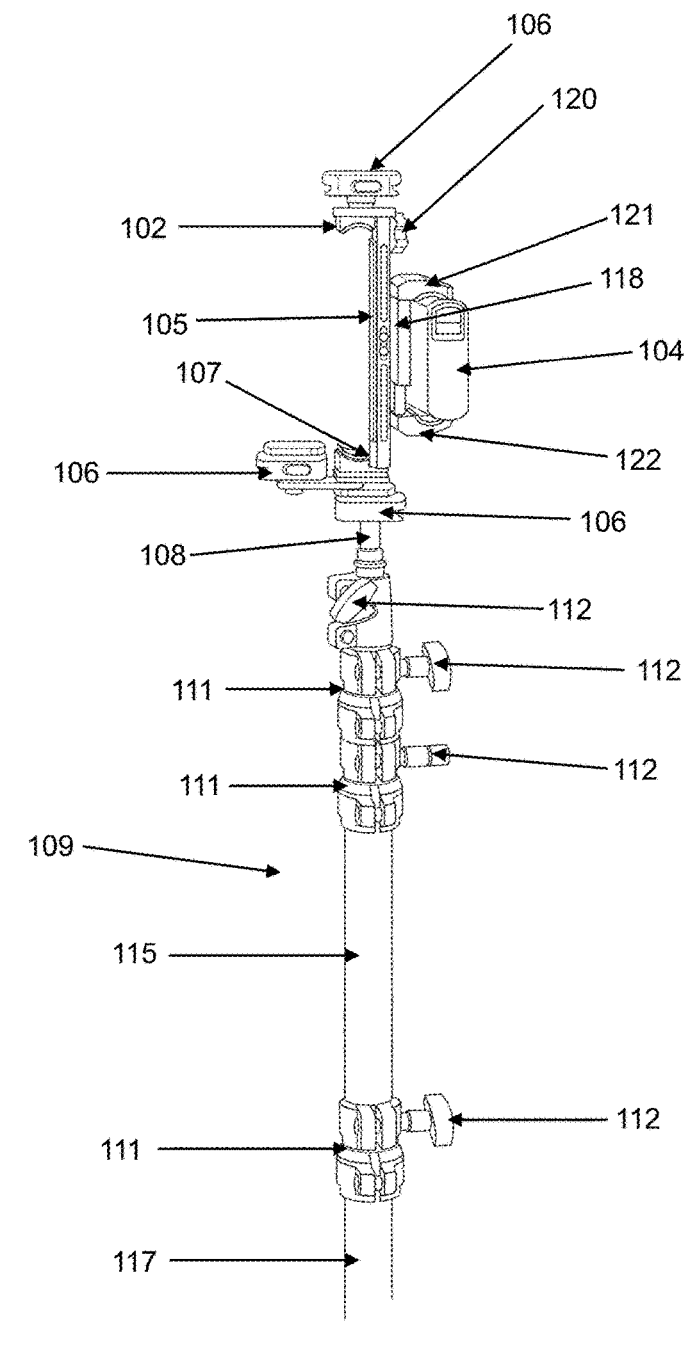
FIG. 3 is a side view of mobile video studio with battery installed.

FIG. 3 shows a side view of tripod 109. In this view, tripod shoe 106 is shown at the base of accessory bracket 105. This tripod shoe 106 is suitable for attachment of a camera or other accessory device. Also seen in this view is battery bracket 118 comprising upper battery bracket arm 121 and lower battery bracket arm 122. Bracket adjustment screw 120 is also shown at the top of accessory bracket 105. When bracket adjustment screw 120 is in the unlocked position, the jaws of accessory bracket 105 may be adjusted in position. In the locked position, bracket adjustment screw 120 secures upper bracket jaw 102 and lower bracket jaw 107 in a fixed position, thus providing secure attachment of the accessory.

Figure 4:
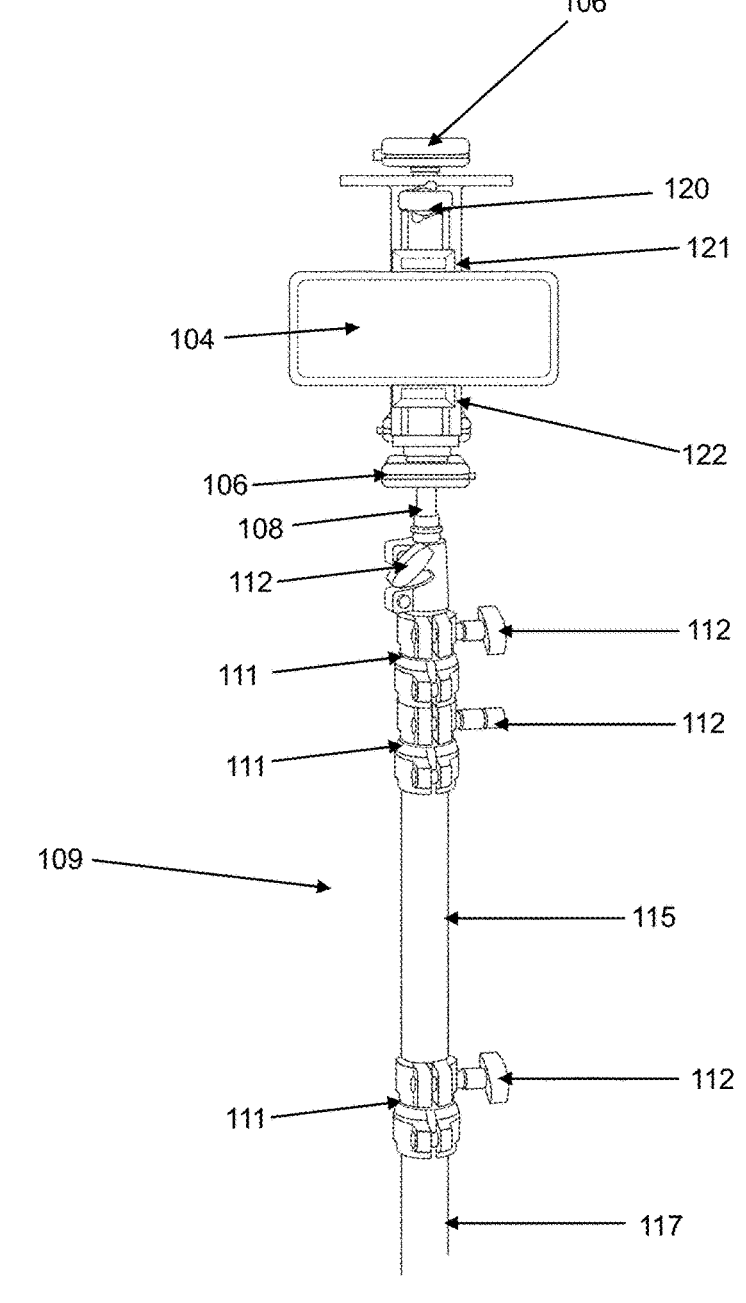
FIG. 4 is a rear view of mobile video studio with battery installed.

FIG. 4 shows a rear view of tripod 109 without tablet, camera or lights installed. In this view, battery 104 is shown secured by upper battery bracket jaw 121 and lower battery bracket jaw 122.

Figure 5:
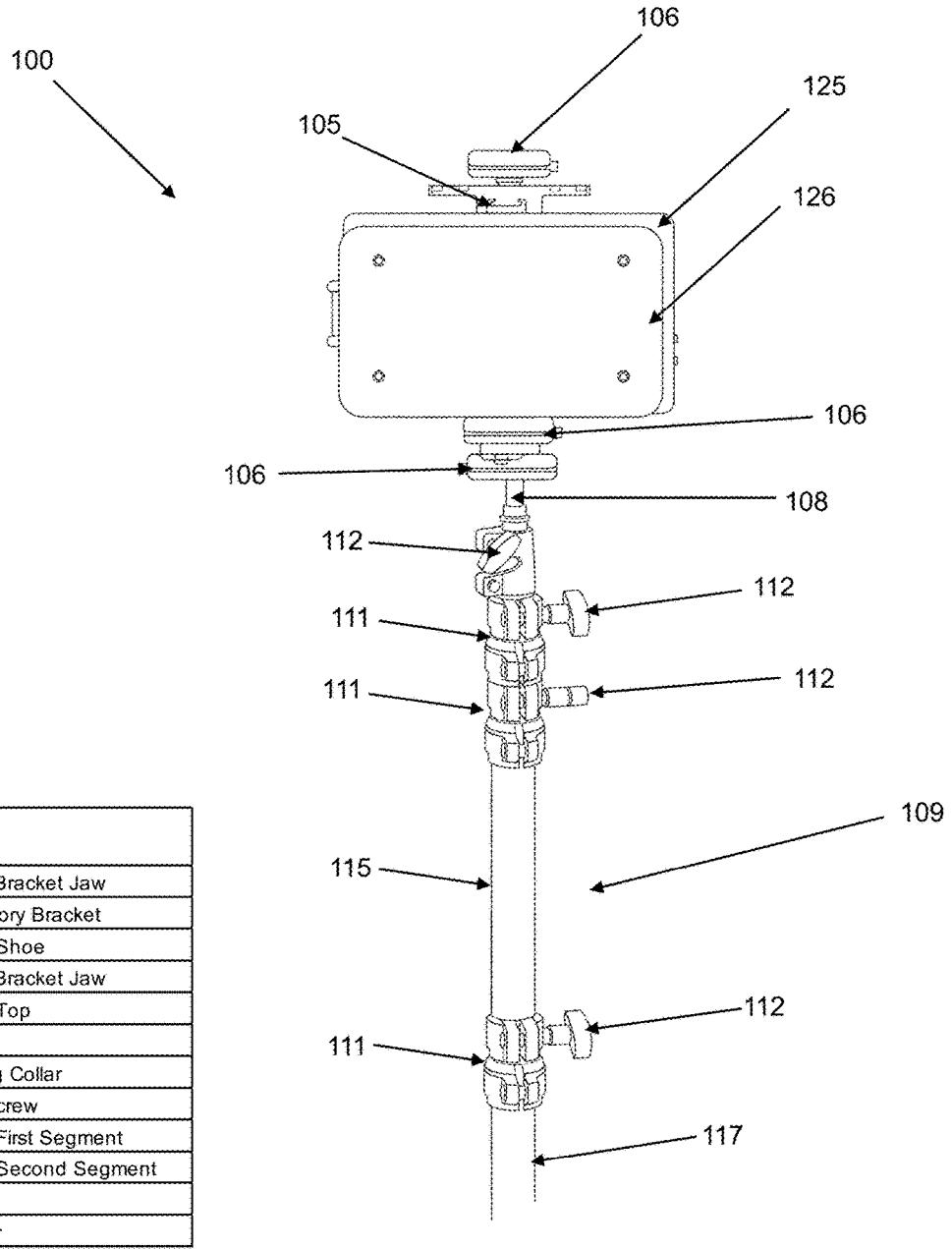
FIG. 5 is a front view of mobile video studio with one light installed.

FIG. 5 shows a front view of mobile video studio 100 with light 125 installed in tripod shoe 106. Also shown in this view is diffuser 126 secured to light 125. Diffuser 126 is a frosted transparent panel that softens the harshness of the direct light of light 125.

Figure 6:
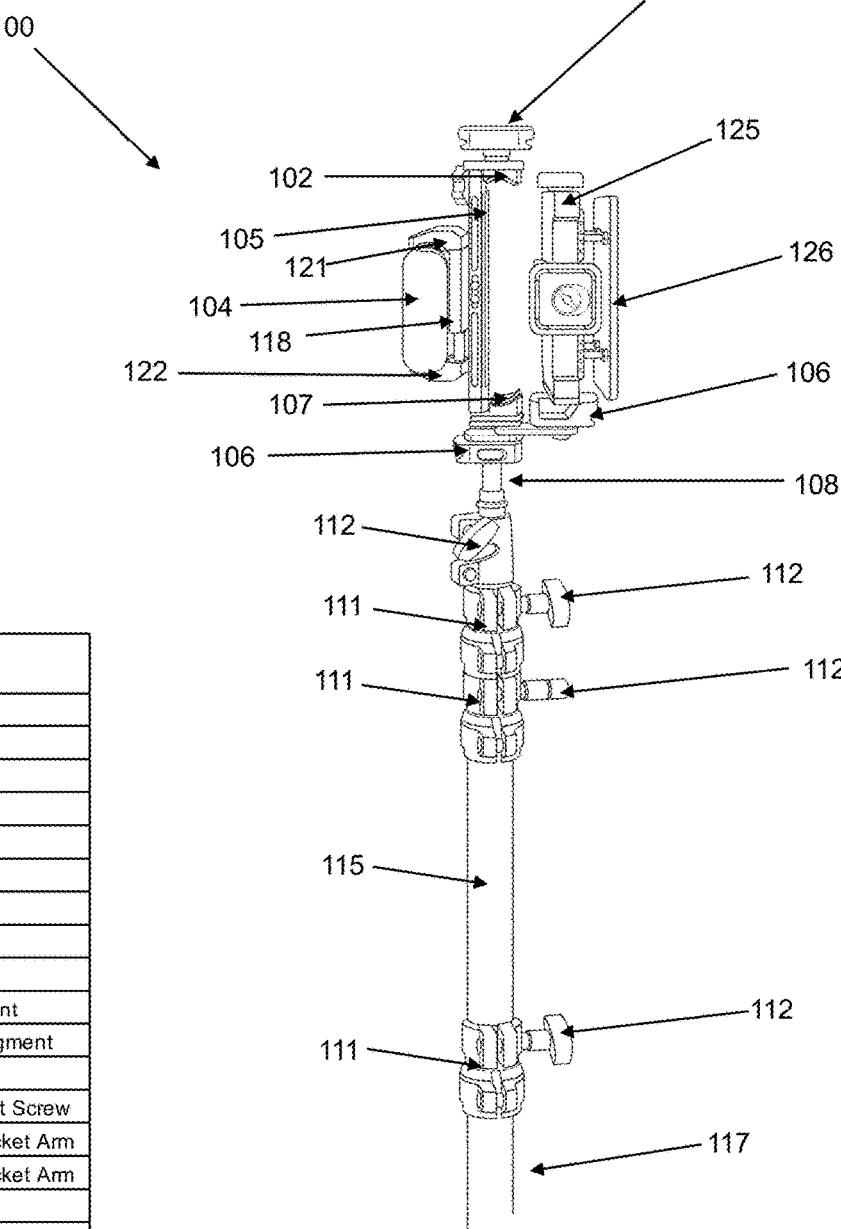
FIG. 6 is a side view of mobile video studio with one light installed.

FIG. 6 shows a side view of mobile video studio 100 with light 125 installed in tripod shoe 106. Battery 104 is also seen attached to the rear of accessory bracket 105. No accessory is installed in accessory bracket 105 in this view.

Figure 7:
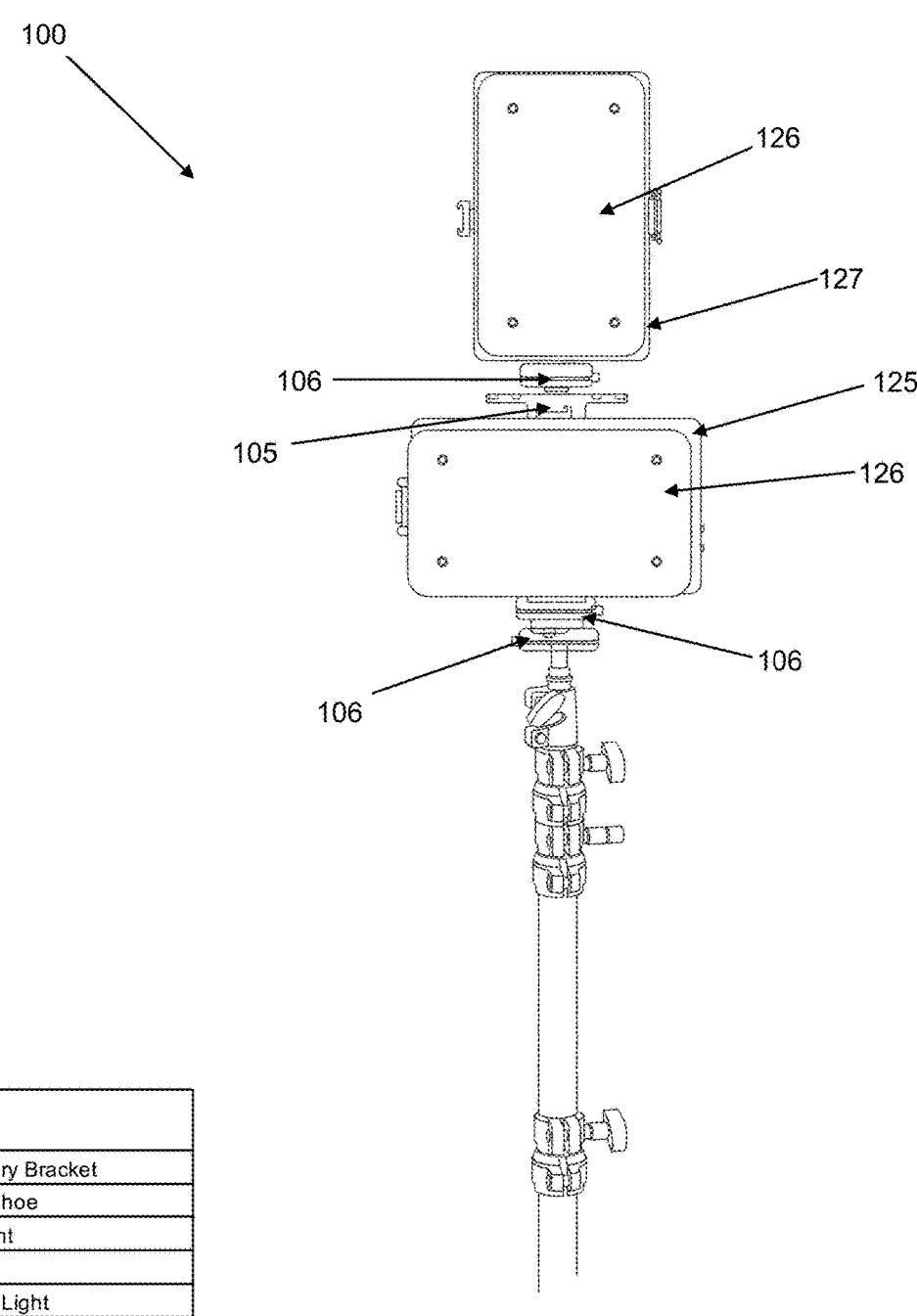
FIG. 7 is a front view of mobile video studio with two lights installed.

FIG. 7 shows a front view of mobile video studio 100 with first light 125 and second light 127 installed. Both lights have diffuser 126 installed on the front of them. First light 125 is installed on tripod shoe 106. Second light 127 is installed on a second tripod shoe 106 that is fixed to the top of accessory bracket 105.

Figure 8:
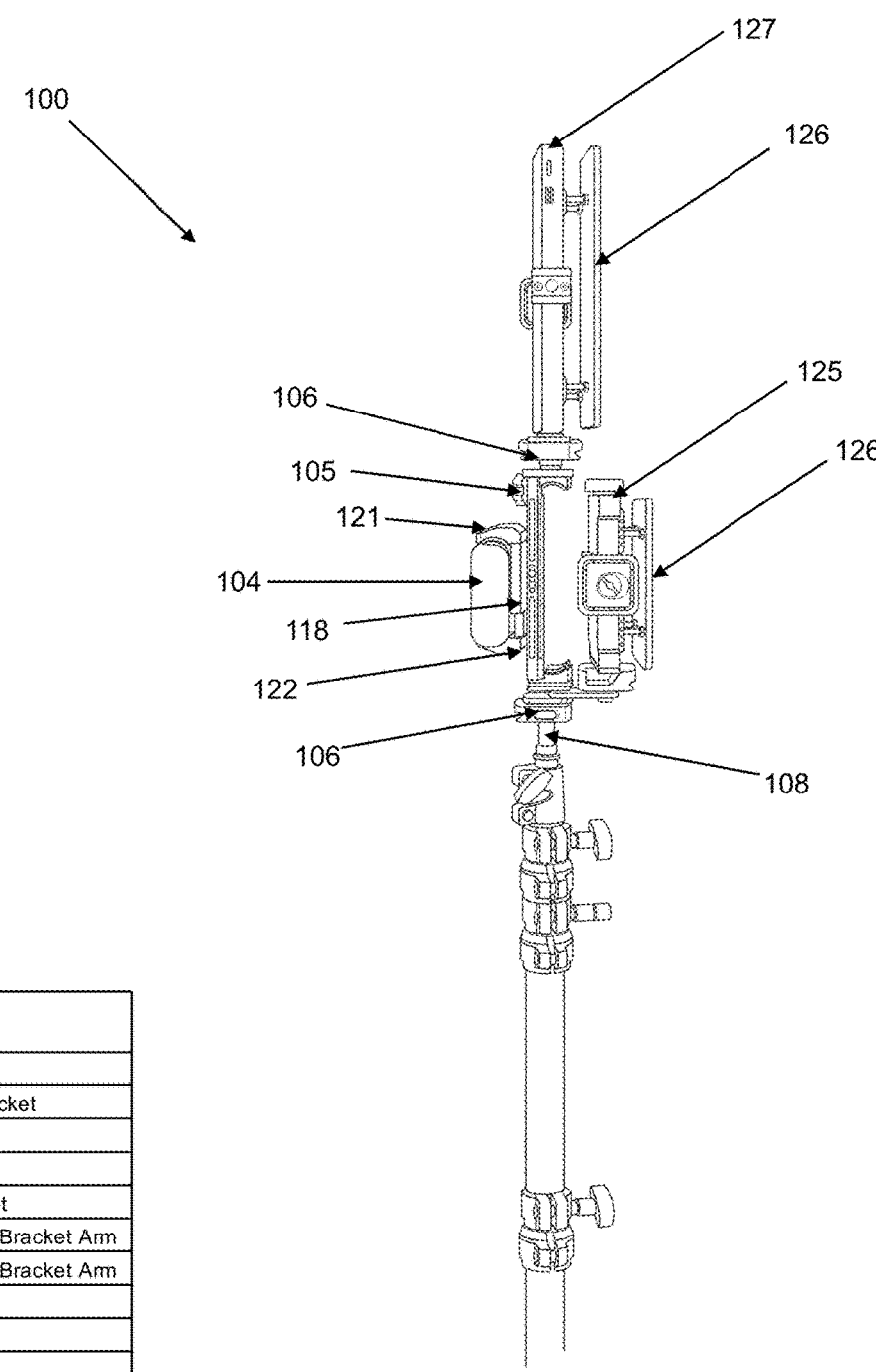
FIG. 8 is a side view of mobile video studio with two lights installed.

FIG. 8 shows a side view of mobile video studio 100 with first light 125 and second light 127 installed. Again, both lights have diffuser 126 affixed to the front of the light to provide softer lighting for less shadows and harshness. Battery 104 is affixed to the rear of accessory bracket 105. Accessory bracket 105 is secured to tripod top 108 with tripod shoe 106. First light 125 is affixed to accessory bracket 105 with another tripod shoe 106. Lastly, second light 127 is affixed to the top of accessory bracket 105 by a third tripod shoe 106.

Figure 9:
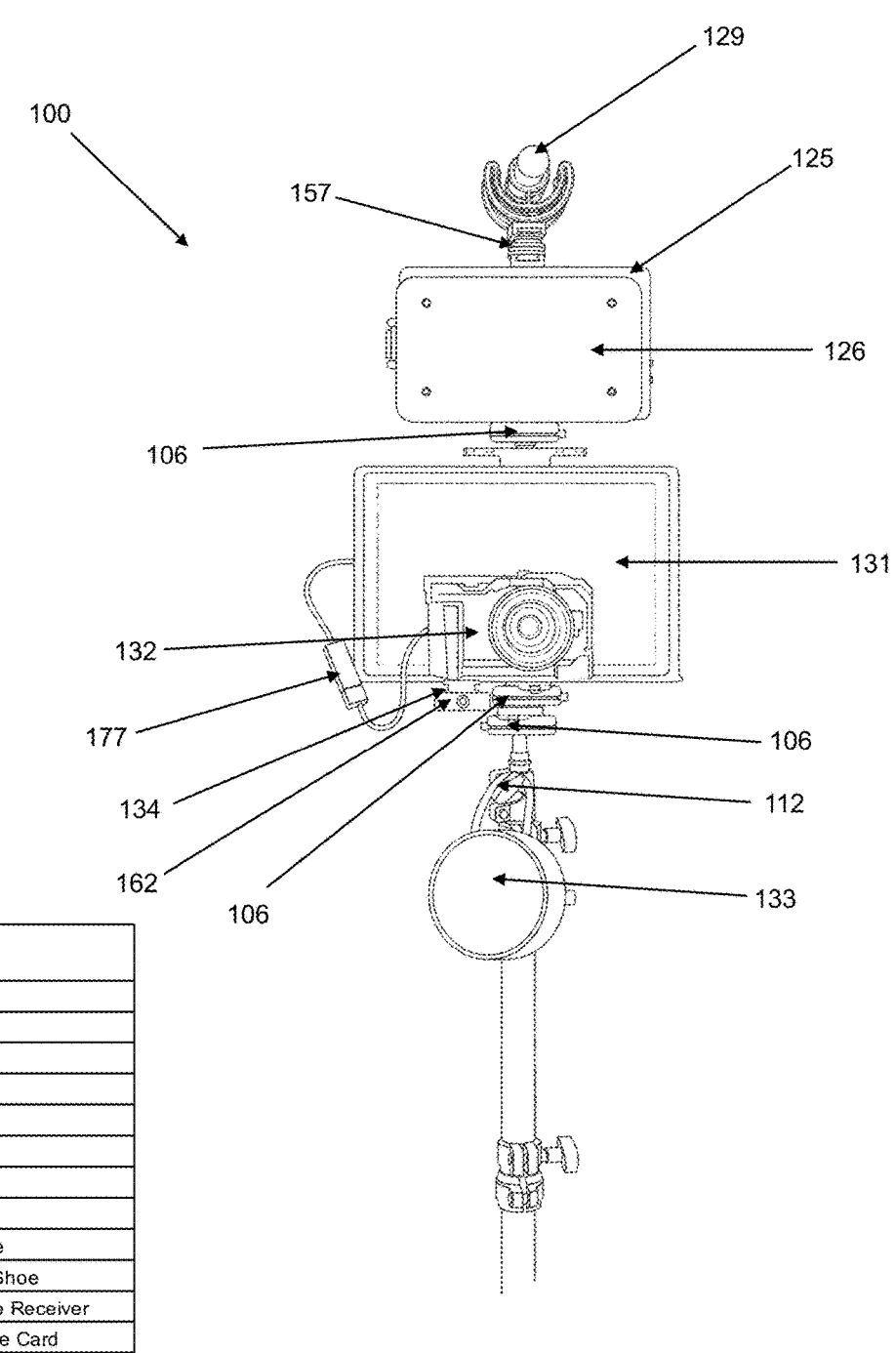
FIG. 9 is a front view of mobile video studio with one camera, a tablet, one light, two microphones and a speaker installed.

FIG. 9 shows a front view of mobile video studio 100 with first camera 132, first light 125, tablet 131, microphone 129, camera cage receiver 162, video capture card 177, and speaker 133 affixed.

Figure 10:
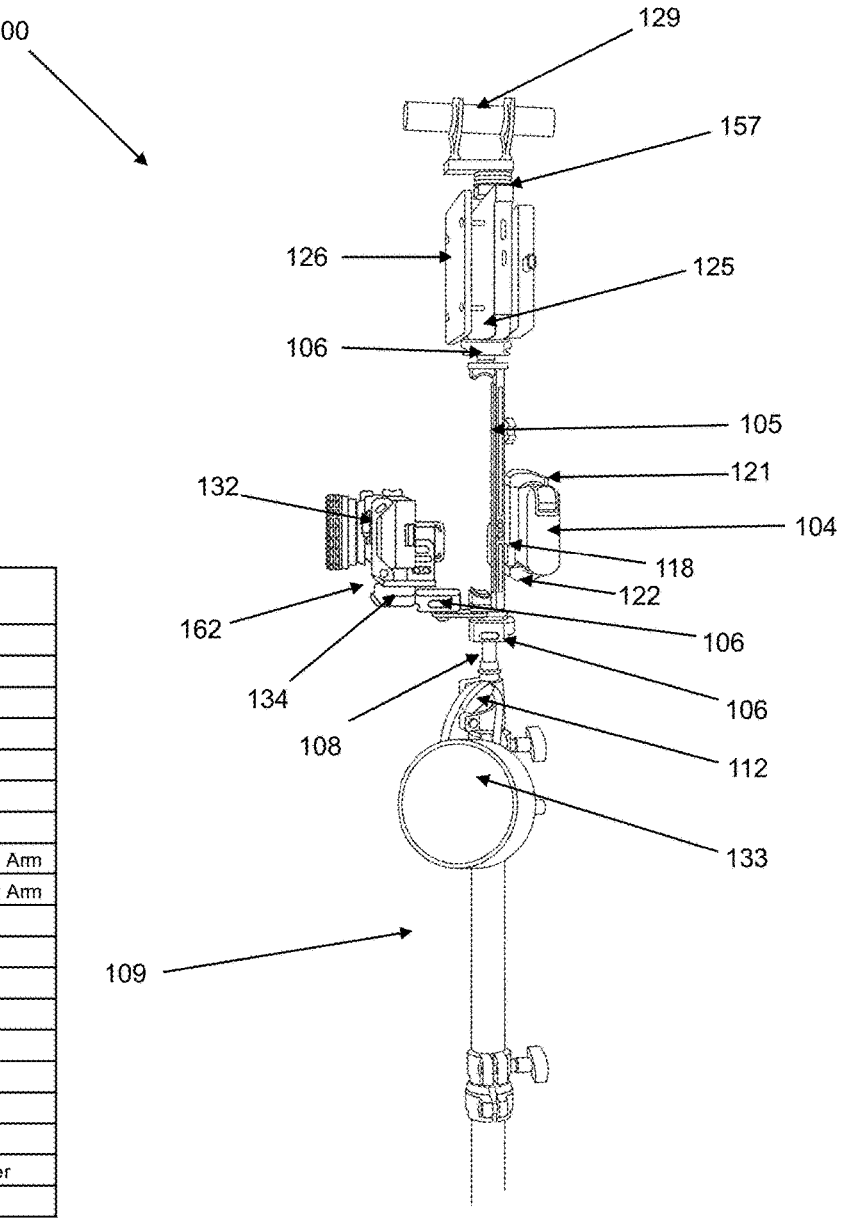
FIG. 10 is a side view of mobile video studio with one camera, a tablet, one light, a microphone and a speaker installed.

FIG. 10 is a side view of mobile video studio 100 with first camera 132, first light 125, microphone 129, camera cage receiver 162, battery 104 and speaker 133 attached. In this view, accessory bracket 105 is empty. Microphone 129 is affixed to the top of first light 125 with microphone shoe 157. First light 125 is attached to accessory bracket 105 with a first tripod shoe 106. Battery 104 is attached to the rear of accessory bracket 105 with battery bracket 118. First camera 132 is supported by camera cage 134, which is supported by a second tripod shoe 106. Camera cage 134 also includes a built in wireless camera cage receiver 162. Accessory bracket 105 is attached to tripod top 108 by a third tripod shoe 106. Lastly, speaker 133 is hung on one of the lock screws 112 on tripod 109.

Figure 11:
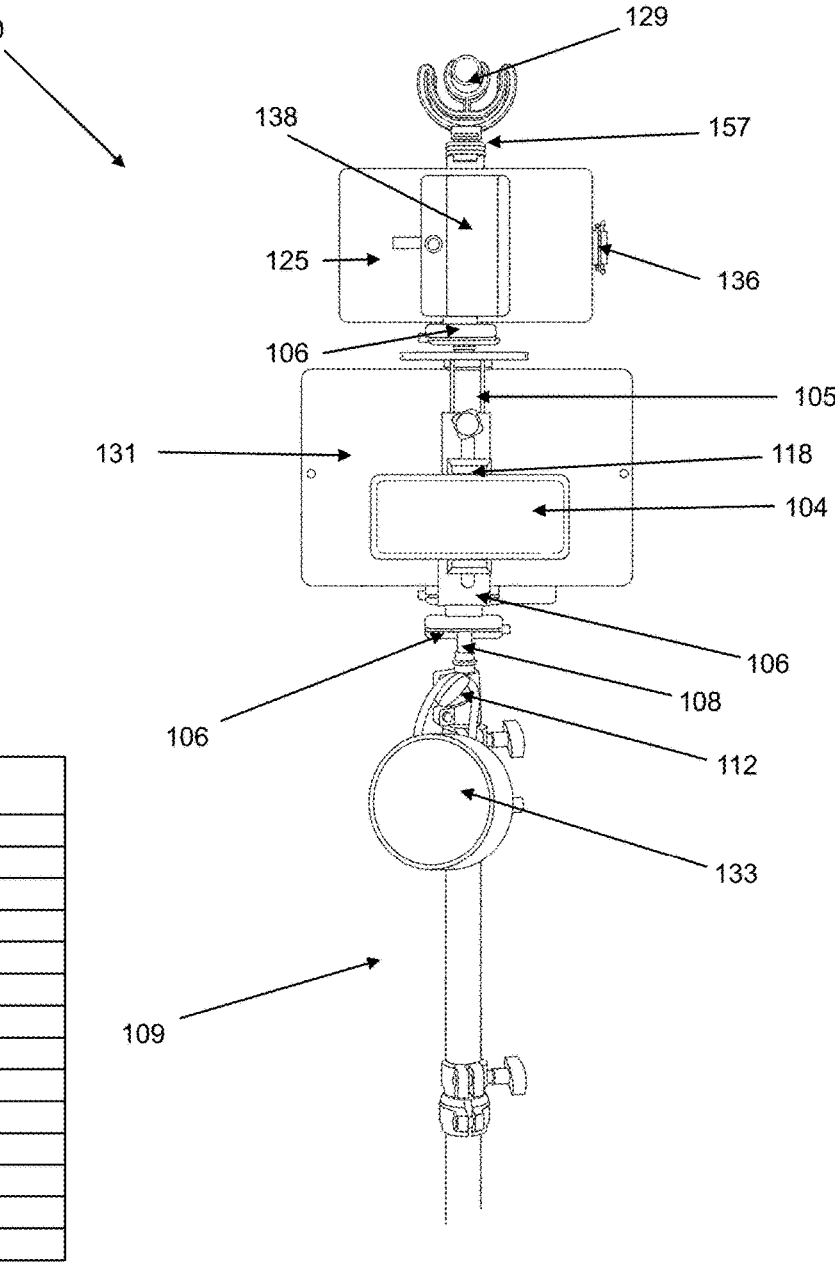
FIG. 11 is a rear view of mobile video studio with one camera, a tablet, one light, a microphone and a speaker installed.

FIG. 11 is a rear view of mobile video studio 100 in a configuration including tablet 131, first light 125 and microphone 129. Tablet 131 is installed in accessory bracket 105 and battery 104 is affixed to the rear of accessory bracket 105 in battery bracket 118. Accessory bracket 105 is secured to tripod top 108 by a first tripod shoe 106, first light is attached to the top of accessory bracket 105 with a second tripod shoe 106 and microphone 129 is affixed to the top of first light 125 with microphone shoe 157. Light shoe 136 is visible in this view, which may be utilized to attach further accessories to first light 125 or attach first light 125 to tripod head 106 in a vertical position. Speaker 133 is hanging from lock screw 112 on tripod 109. Network connection 138 is affixed to the rear of first light 125 with a magnet in this embodiment, but any other suitable means to affix the network connection 138 well known in the art may be utilized. Network connection 138 provides an internet connection through WiFi, cellular, mobile or other networks. In the preferred embodiment, it provides a fast fifth generation ("5G") digital connection to the internet but any suitable internet connection means may be used.

Figure 12:
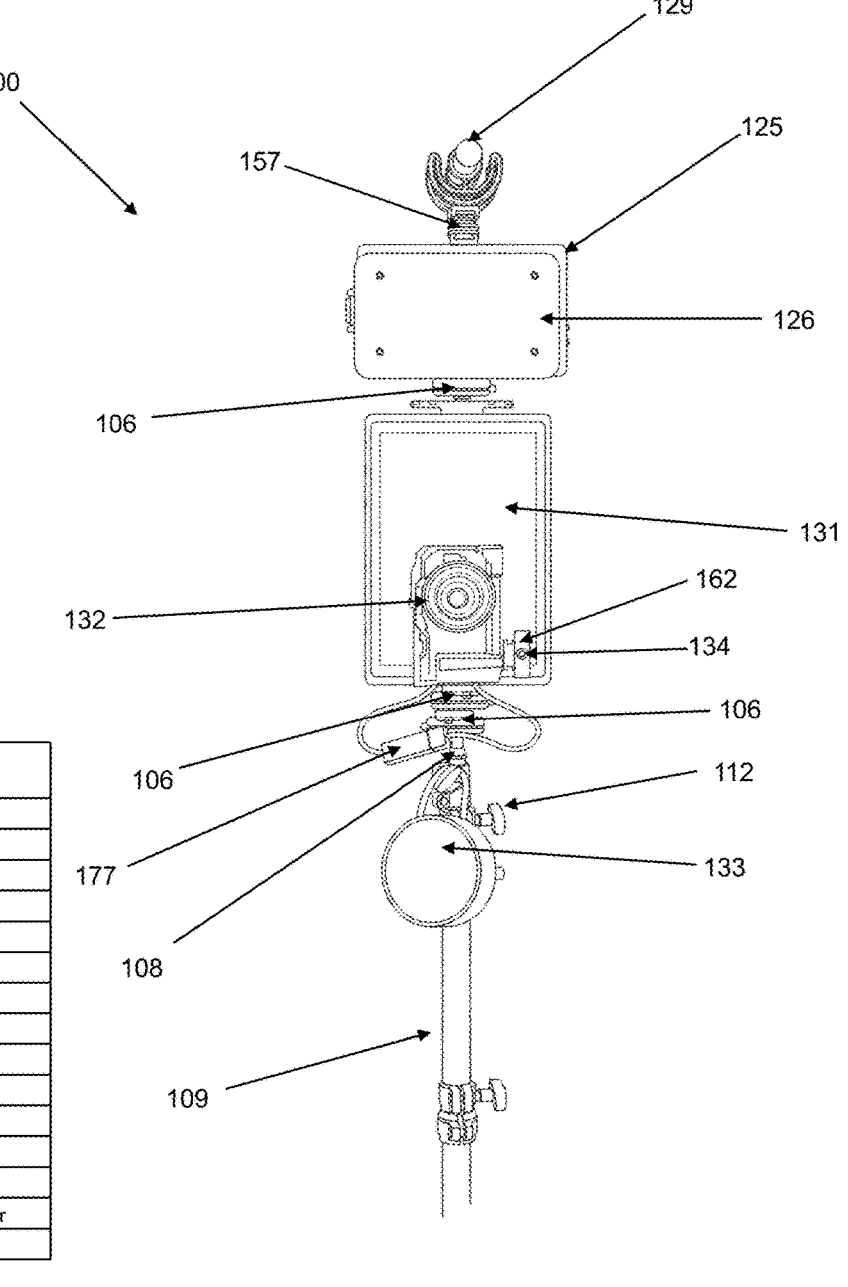
FIG. 12 is a front view of mobile video with one camera in a vertical orientation, a tablet in a vertical orientation, one light, a microphone and a speaker installed.

FIG. 12 is an alternate configuration of mobile video studio 100 with first camera 132 and tablet 131 both in vertical orientations. The flexible configuration options of mobile video studio 100 allow the various accessories to be installed in different locations on the device and in different orientations. The flexible configuration options of mobile video studio 100 also allow the screen of tablet 131 to be less inhibited by camera 132. In this configuration, tablet 131 is installed in accessory bracket 105 in a vertical orientation. Accessory bracket is secured to tripod top 108 on a first tripod head 106. First camera 132 is secured in camera cage 134 and oriented in a vertical position. Camera cage 134 is attached to accessory bracket 105 by a second tripod head 106. First light 125 is affixed to the top of accessory bracket 105 with a third tripod shoe 106. Video capture card 177 is routed between first camera 132 and tablet 131. Lastly, microphone 129 is attached to the top of first light 125 with microphone shoe 157.

Figure 13:
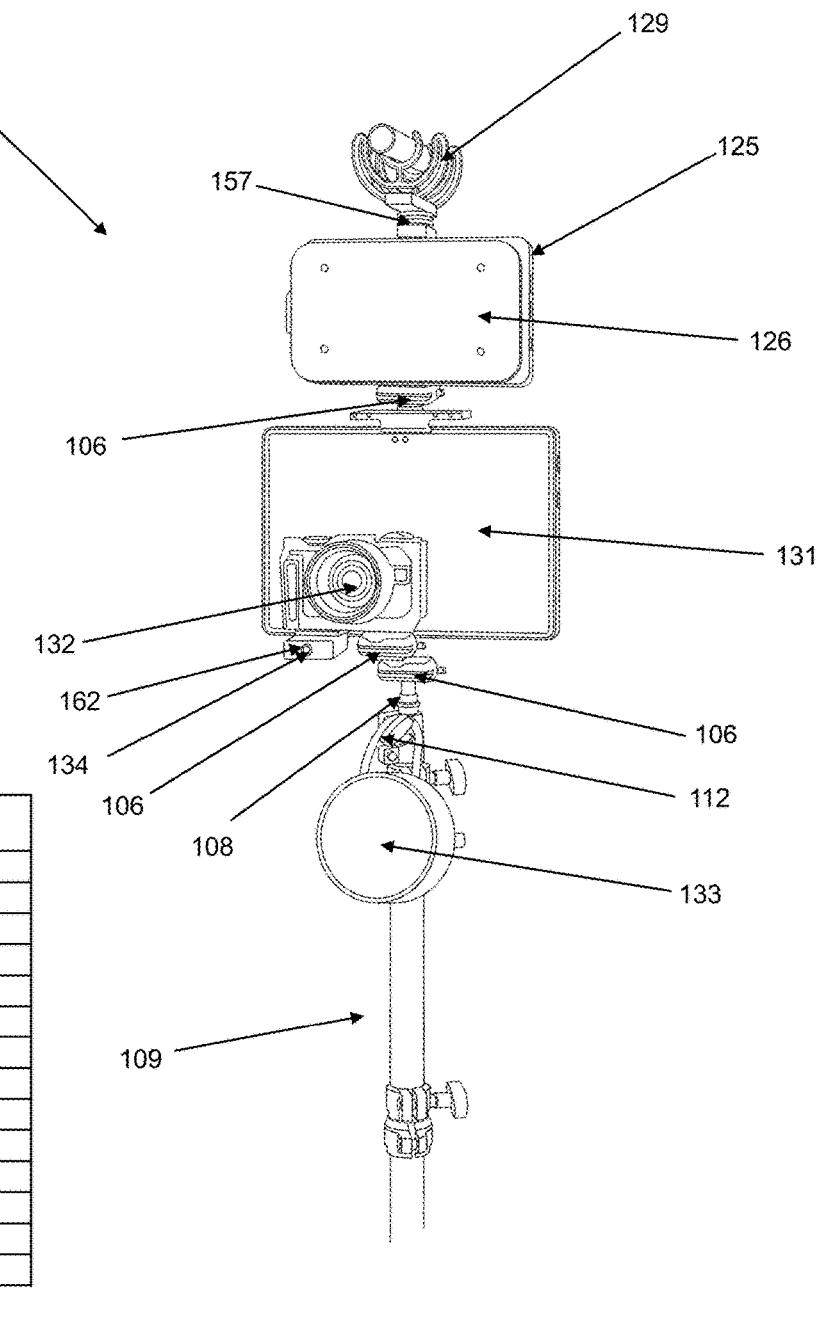
FIG. 13 is a perspective view of mobile video studio with one camera, a tablet, one light, a microphone and a speaker installed.

FIG. 13 is a configuration similar to that shown in FIG. 12 with the difference that first camera 132 and tablet 131 are both installed in horizontal orientations. Each accessory in this view is secured in the same method discussed in relation to FIG. 12.

Figure 14:
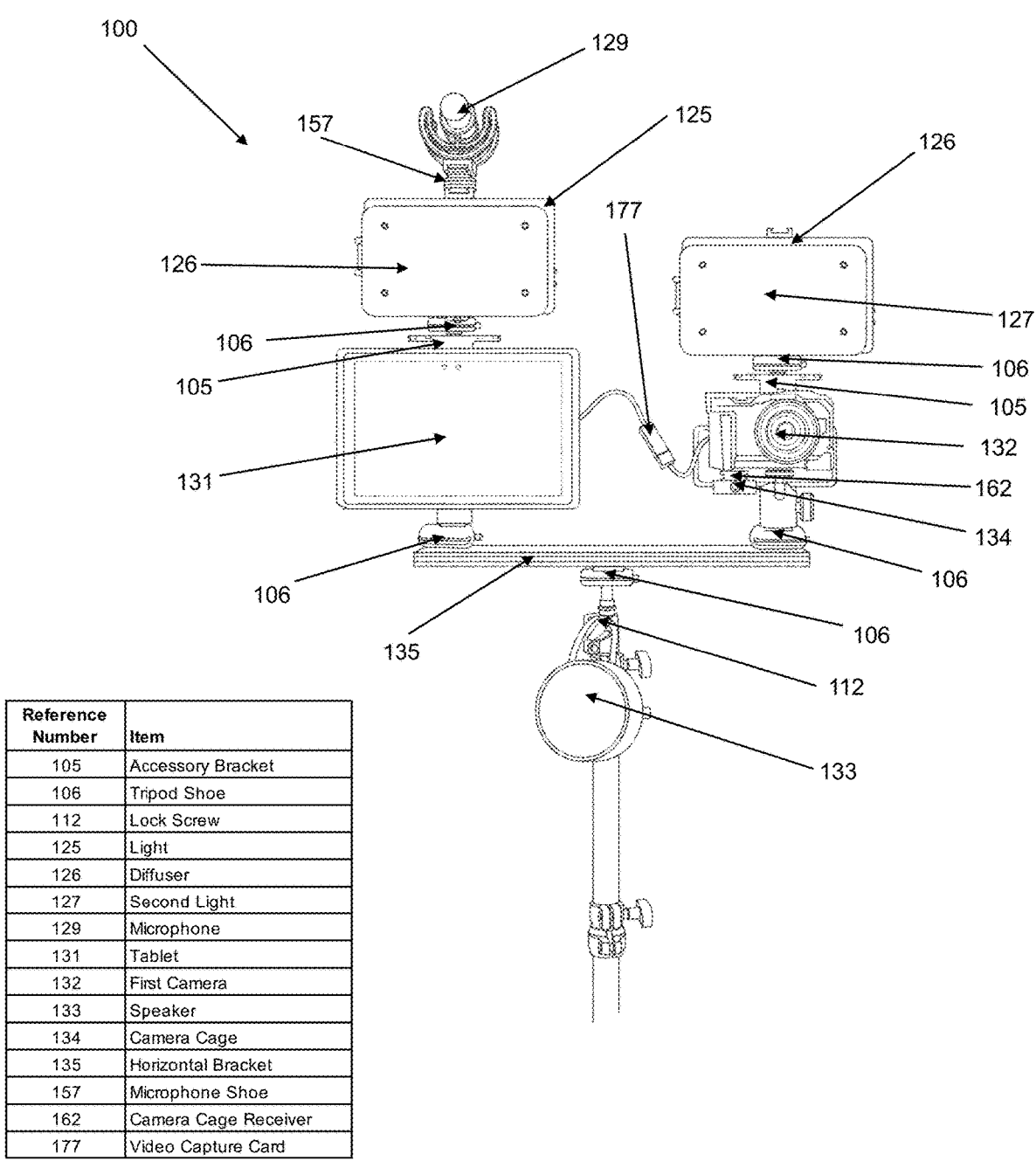
FIG. 14 is a front view of mobile video studio with horizontal bracket, one camera, two lights, a microphone and a speaker installed.

FIG. 14 shows an alternate configuration of the mobile video studio 100 with horizontal bracket 135 installed. In this configuration, horizontal bracket 135 has two ends, each with a tripod shoe 106. On the first side (in this view, left side), a first accessory bracket 105 is installed in the first tripod shoe 106. Tablet 131 is installed in this accessory bracket 105 in a horizontal configuration. At the top of the first accessory bracket, first light 125 is installed in a tripod shoe fixed to the top of the accessory bracket 105. Microphone 129 is installed in microphone shoe 157 affixed to the top of first light 125.

On the second side (in this view, right side), a second accessory bracket 105 is installed in a second tripod shoe 106. First camera 132 is secured within camera cage 134, which is affixed to a third tripod shoe 106. Nothing is installed in the second accessory bracket 105, but at the top a fourth tripod shoe 106 secures a second light 1287.

Figure 15:
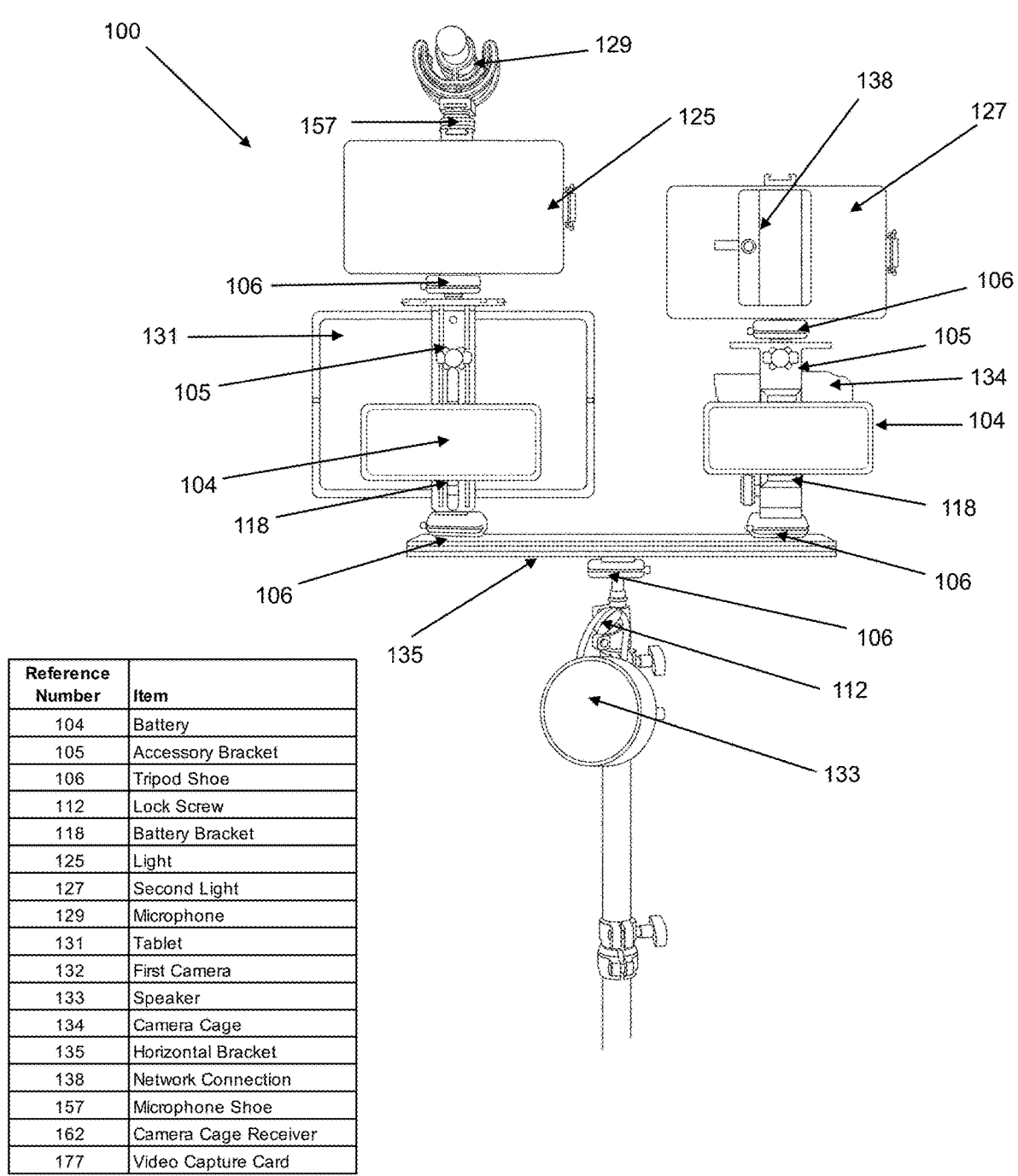
FIG. 15 is a rear view of mobile video studio with horizontal bracket, one camera, two lights, a microphone and a speaker installed.

FIG. 15 shows a rear view of the configuration shown in FIG. 14. Here, the first accessory bracket 105 is shown with first battery 104 installed in first battery bracket 108. Second accessory bracket 105 is shown with second battery 104 installed in second battery bracket 118. Tablet 131 is shown installed in first accessory bracket 105 with first light 125 at the top of the accessory bracket. Microphone 129 is installed at the top of first light 125 in microphone shoe 157.

Second accessory bracket 105 is empty but first camera 134 installed at its base. Second light 127 is installed at the top of second accessory bracket 105 and fixed in place with tripod shoe 106. Network connection 138 is affixed to the rear of second light 127. Network connection 138 provides an internet connection through WiFi, cellular, mobile or other networks. In the preferred embodiment, it provides a fast fifth generation ("5G") digital connection to the internet but any suitable internet connection means may be used.

Figure 16:
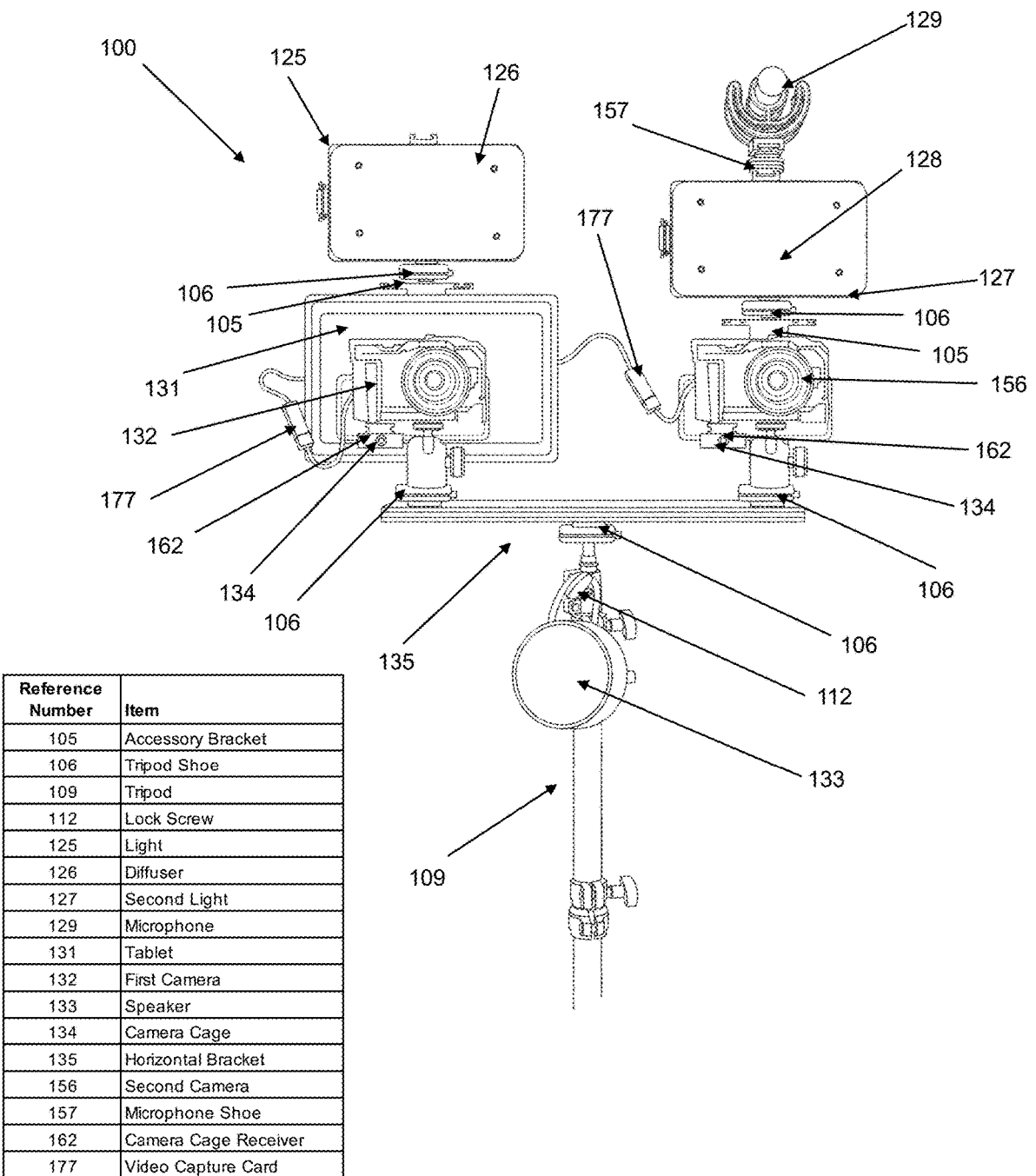
FIG. 16 is a front view of mobile video studio with horizontal bracket, two cameras, two lights, a microphone and a speaker installed.

FIG. 16 shows a two camera configuration of mobile video studio 100. In this view, first camera 132 is installed in first tripod shoe 106 (on the left side, in this figure). Second camera 156 is installed in second tripod shoe 106 (on the right side, in this figure). First accessory bracket 105 secures tablet 131 and first light 125 above tablet. A first video capture card 177 is connected between first camera 132 and a second video capture card 177 is connected between second camera 156 and tablet 131. Second accessory bracket 105 is empty but second light 127 and microphone 129 are installed above the bracket. The accessories are secured to tripod 109 and horizontal bracket 135 as discussed in relation to prior figures.

Figure 17:
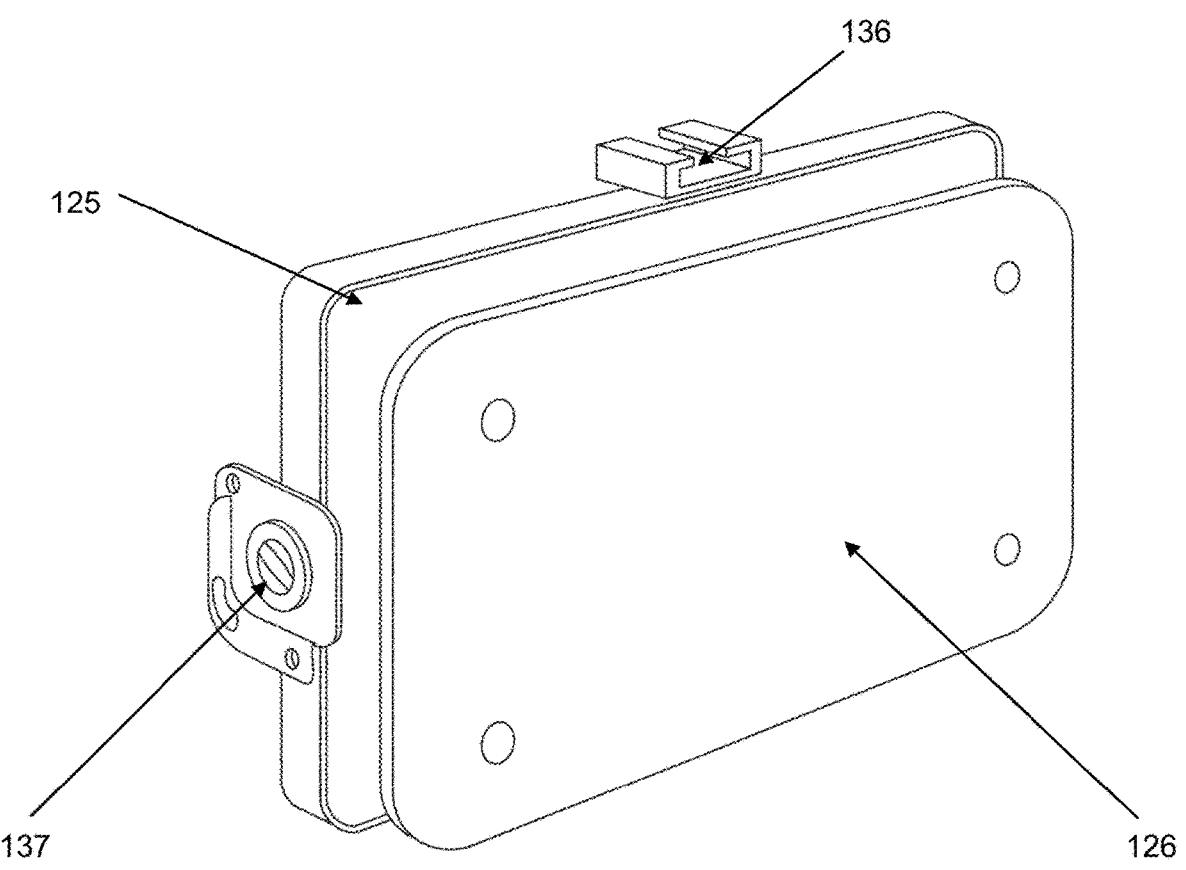
FIG. 17 is a perspective view of a light with a diffuser installed.

FIG. 17 shows a detailed view of first light 125. In this view, diffuser 126 is installed on the front of first light 125. Also visible is first light connector 137 which is coupled with tripod shoe 106 to secure the light to the mobile video studio. When this shoe connector 137 is in use, the light is oriented in a vertical fashion, Light shoe 136 allows attachment of various accessories to first light 125 and operates similarly to tripod shoe 106.

Figure 18:
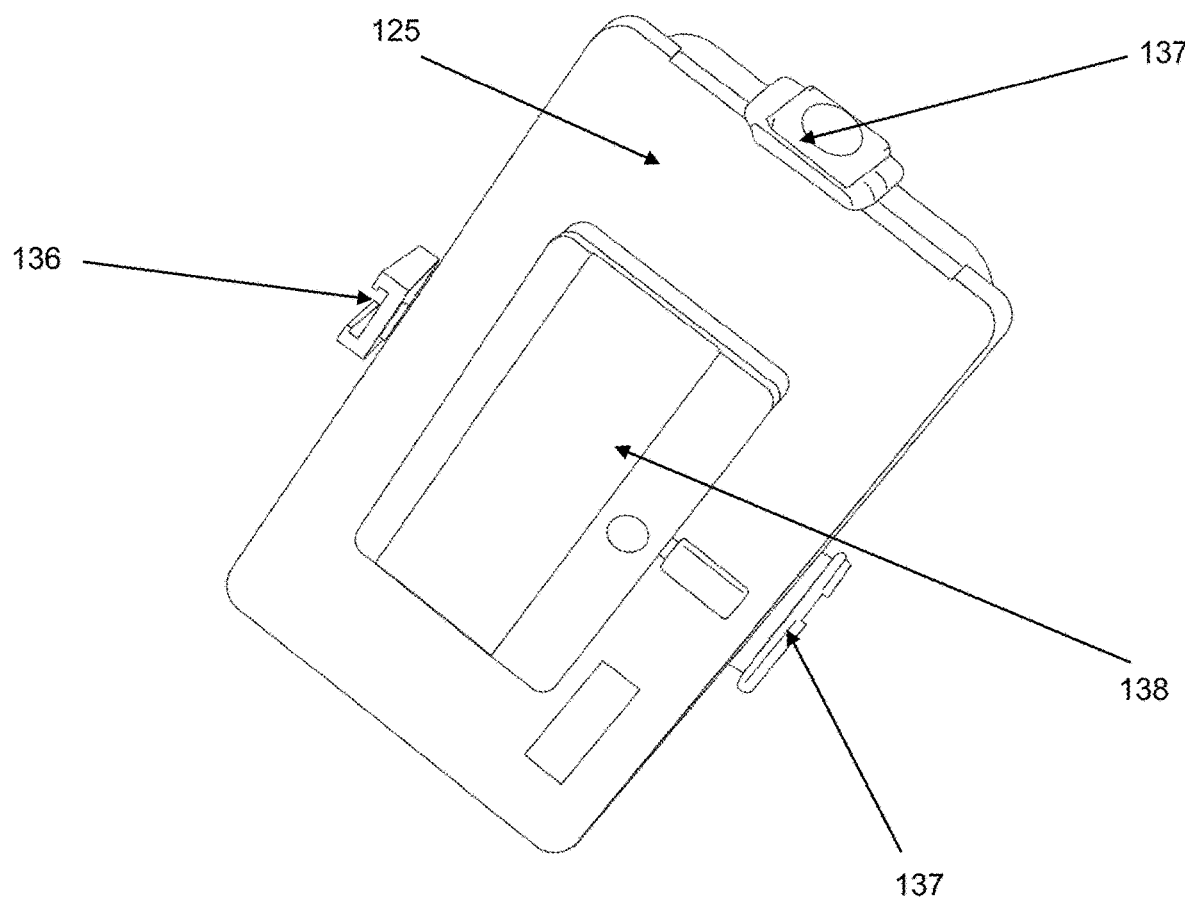
FIG. 18 is a rear perspective view of a light with a network connection device installed.

FIG. 18 shows a rear view of first light 125 with network connection 138 affixed to the rear of the light. First light connector 137 is shown as is second light connector 139. First light connector 137 allows mount of first light in a vertical orientation. Second light connector 139 enables mounting of the light in a horizontal orientation.

Figure 19:
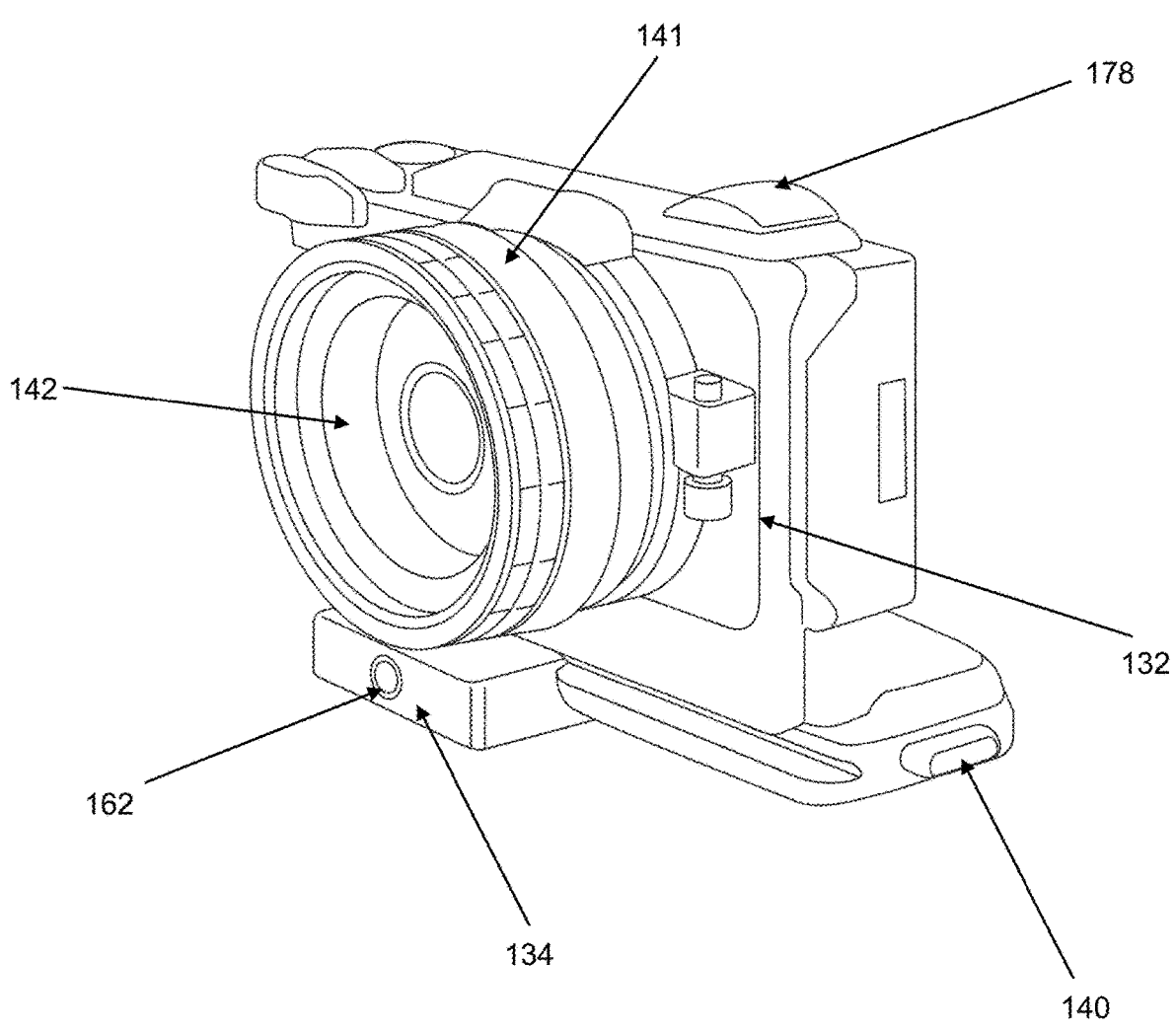
FIG. 19 is a perspective view of a camera in a camera cage with a wide angle lens installed.

FIG. 19 is a detailed view of first camera 132 installed in camera cage 134. Also seen here is cage release 140. When depressed, cage release 140 allows removal of the camera from camera cage 134. In this configuration, wide angle lens 142 is installed on camera lens 141. Wide angle lens 142 allows a larger field of view and thus capture of larger vertical and horizontal space within the camera frame at the same camera distance from the subject as with camera lens 141. Wide angle lens 142 is one example of the hundreds of interchangeable lenses available in the industry. Any suitable lens or combination of lens mount well known in the art may be utilized. Camera cage 134 also includes a built-in wireless camera cage receiver 162. Camera cage 134 further includes level 178. Level 178 is a one-axis circular spirit level that assists the user in measuring whether the camera is installed in a manner level to the ground. A circular spirit level is comprised of a vial of liquid, generally oil, alcohol or other spirit. The vial is not completely filled with liquid leaving an air bubble in the vial. In a circular spirit level, there is a circular window in the vial with a round target. When the air bubble is oriented within the bubble, the spirit level is level with the ground. In this manner, the circular spirit level provides level measurement in a single axis (the horizontal axis). Spirit levels are also referred to as bubble levels or just levels.

It is also anticipated that a two-axis level comprising two tubular levels, one measuring the horizontal axis, and one measuring the vertical axis, may be used. A tubular level is formed of a tube-shaped vial, partially filled with liquid, with the void forming an air bubble. The tubular vial also includes central measurement marks. When the air bubble is between the central measurement marks, the tubular level is considered level. A two-axis level has a tubular level in the vertical orientation and one in the horizontal orientation. This two-axis level may be installed in one of the various light shoes 136. It is also anticipated that a three-axis level may be utilized, with two tubular levels installed horizontally, perpendicular to each other, and a third tubular level installed vertically. While these configurations are disclosed as part of the preferred embodiment, any suitable level or combination of levels well known in the art may be utilized.

Figure 20:
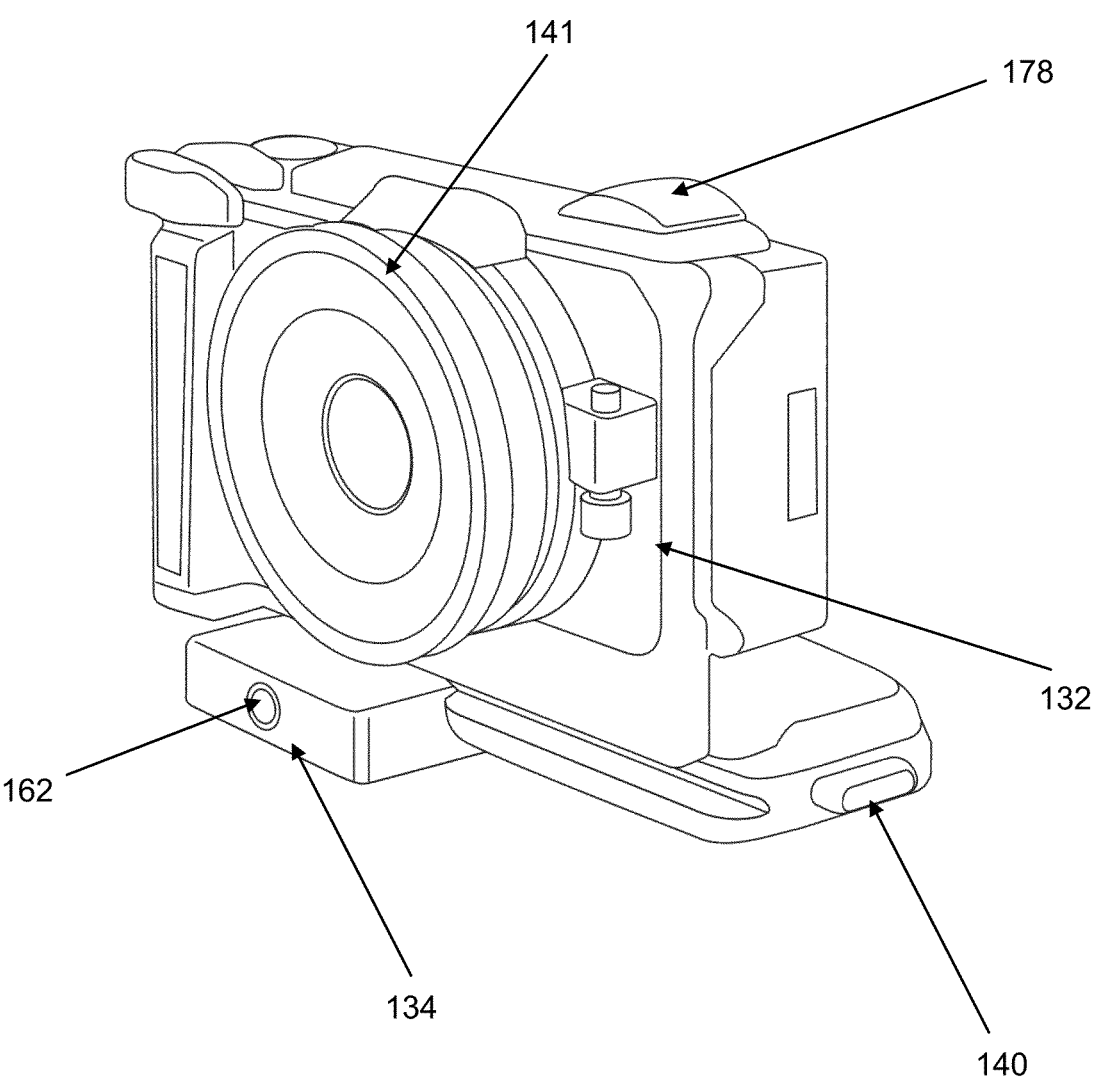
FIG. 20 is a perspective view of a camera in a camera cage.

FIG. 20 is a second detailed view of first camera 132. In this view, no wide angle lens 142 is installed and only camera lens 132 is in use.

Figure 21:
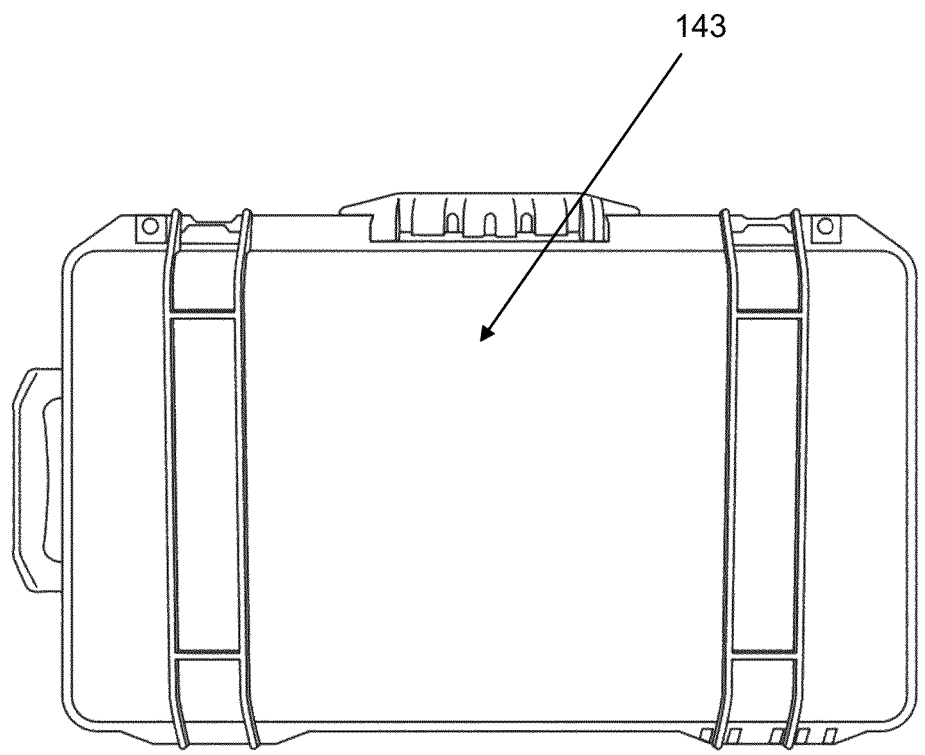
FIG. 21 is a view of the carrying case for the mobile video studio.

FIG. 21 shows an exterior view of carrying case 143. Carrying case 143 is sized and shaped to safely secure and contain all the elements of mobile video studio 100. Carrying case 143 has a hard plastic exterior with a foam rubber interior insert. The foam rubber interior insert has cut-outs shaped to fit the various elements and accessories of mobile video studio 100. Carrying case 143 is suitable for shipping via postal services. FedEx™, UPS™, DHL™ and other shipping services. Carrying case 143 is also durable enough to be suitable for checking or carrying on as baggage on commercial airline flights. In the preferred embodiment, the carrying case 143 is made of hard plastic with a foam rubber insert, but any suitable durable material and shock resistance interior material may be used. Exterior materials may include aluminum, stainless steel, wood, and various plastics. Interior materials may include other foam materials, Styrofoam or other suitable materials well known in the art.

Figure 22:
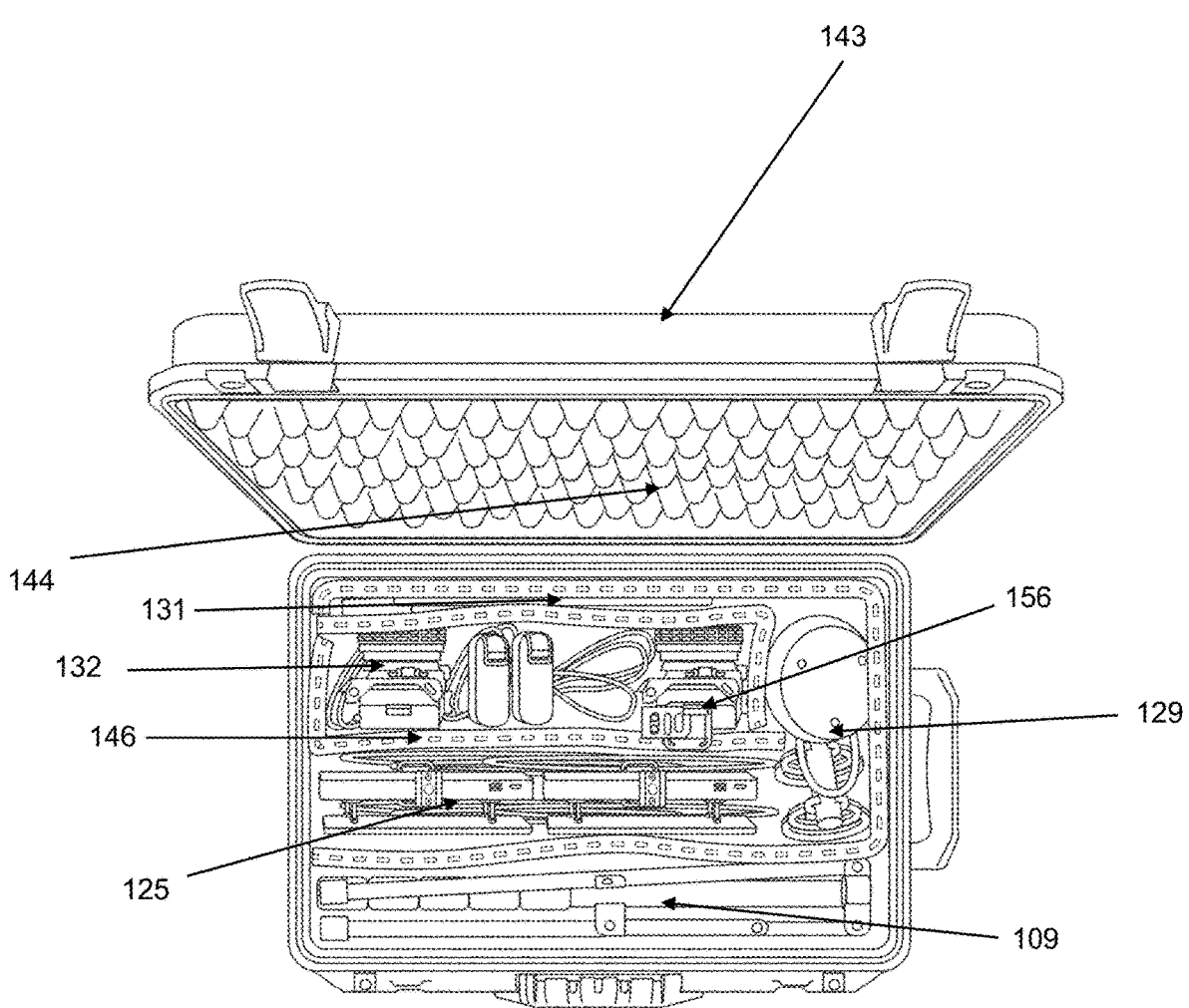
FIG. 22 is a view of the interior of the carrying case for the mobile video studio.

FIG. 22 is a view of carrying case 143 open with its interior visible. The various components of the mobile video studio 100 are cushioned by cushion material 144 and dividers 146. These items are formed of foam rubber and sized to secure the accessories from movement and damaging collision with each other while carrying case 143 is in transit. In this view, first camera 132, second camera 156, tablet 131, microphone 129, first light 125 and tripod 109 are shown secured in their respective storage locations. This view shows just one configuration but other configurations are anticipated under the claims of this invention. Interior materials may include foam rubber, other foam materials, Styrofoam or other suitable materials well known in the art.

Figure 23:
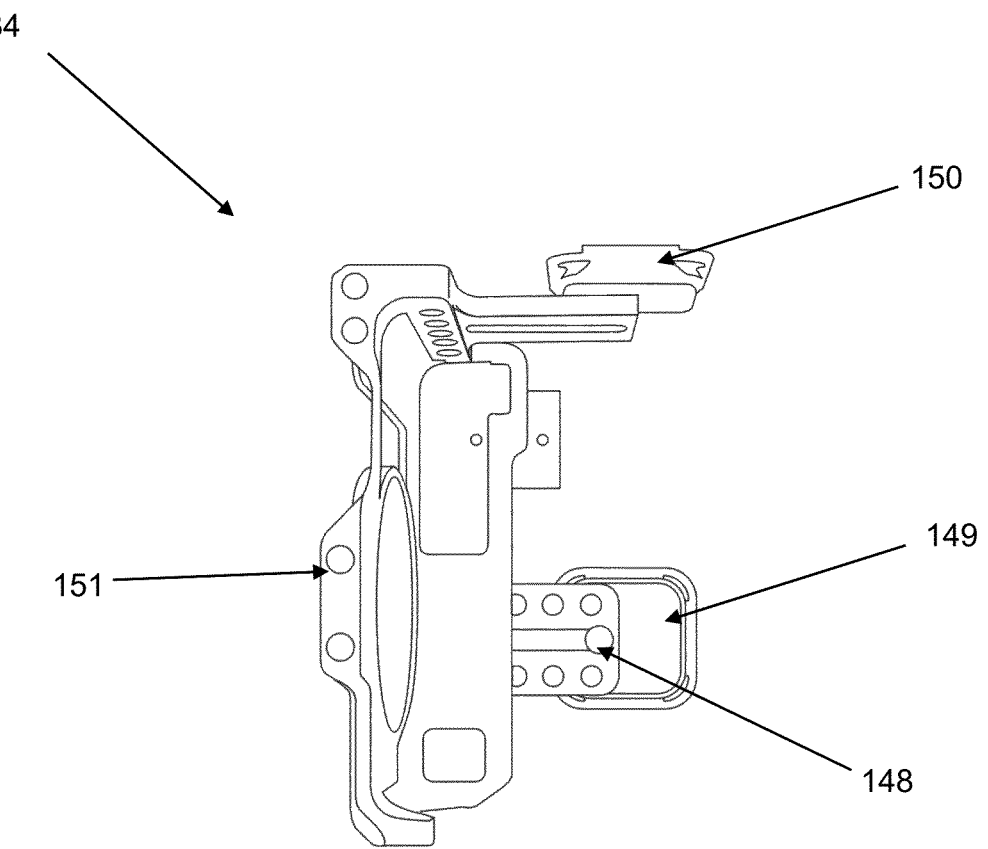
FIG. 23 is a top view of the camera cage.

FIG. 23 is a top view of camera cage 134. Camera cage 134 is secured to the exterior of first camera 132 or second camera 156 and assists in attaching the camera to mobile video studio 100. Screw post 148 is a threaded post that couples with a similar sized and opposite threaded hole in the base of the camera. This screw post 148 couples with this opening and when secured by tightening, holds the camera within camera cage 134. Camera lens 132 fits through lens opening 151. First cage connector 150 is sized to couple with tripod shoe 106 and enables vertical orientation of the camera. Second cage connector 149 is also sized to couple with tripod shoe 106 and enables horizontal orientation of the camera.

Camera cage 134 is manufactured out of aluminum in the preferred embodiment, but any suitable strong and light-weight metal may be used such as stainless steel, titanium or various alloys well known in the art.

Figure 24:
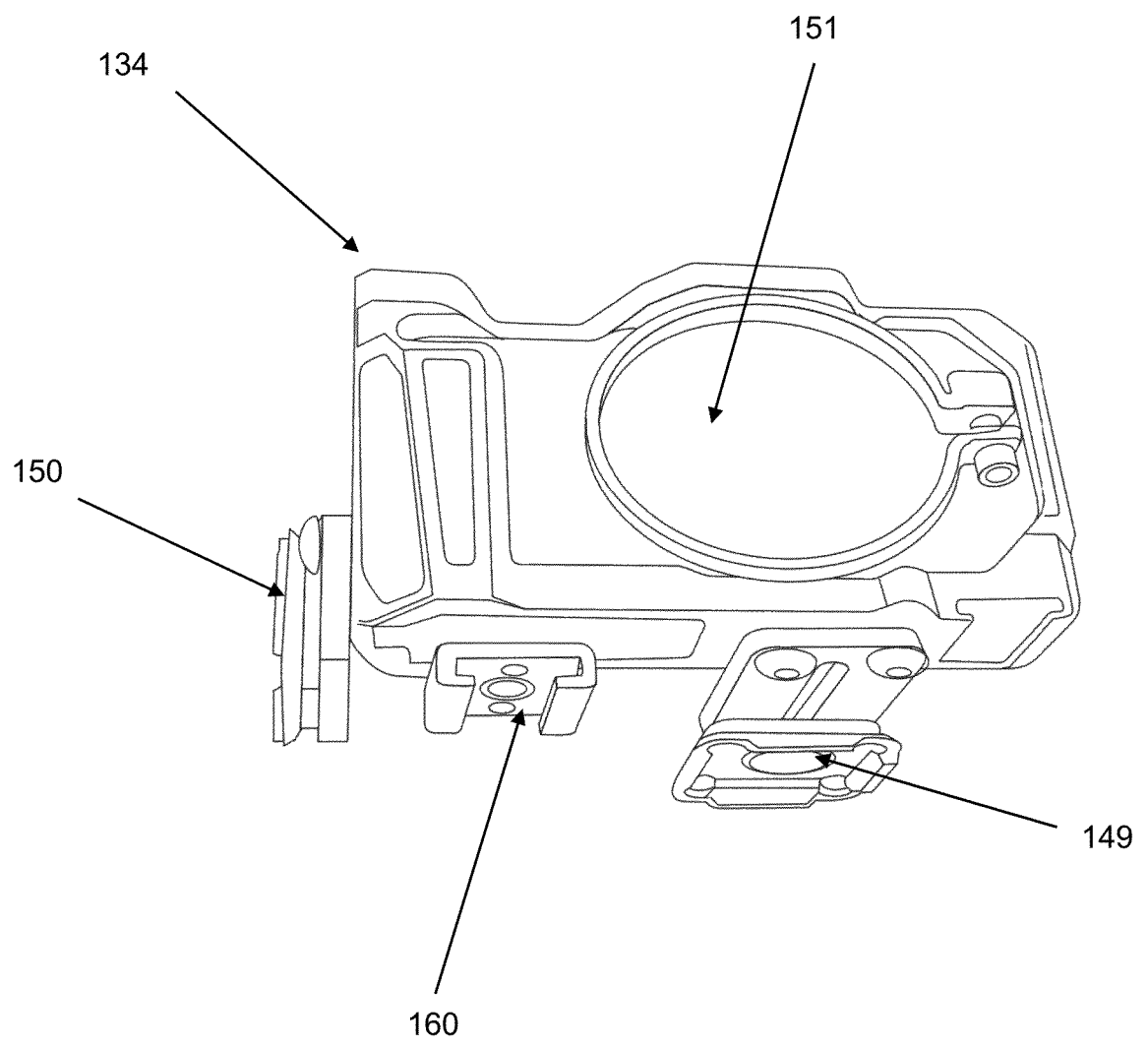
FIG. 24 is a front perspective view of the camera cage.

FIG. 24 shoes a front perspective view of camera cage 134. First cage connector 150 and second cage connector 149 are visible, as is lens opening 151. First cage shoe allows additional items to be attached to the camera con-nector using a shoe connector as detailed throughout this document.

Figure 25:
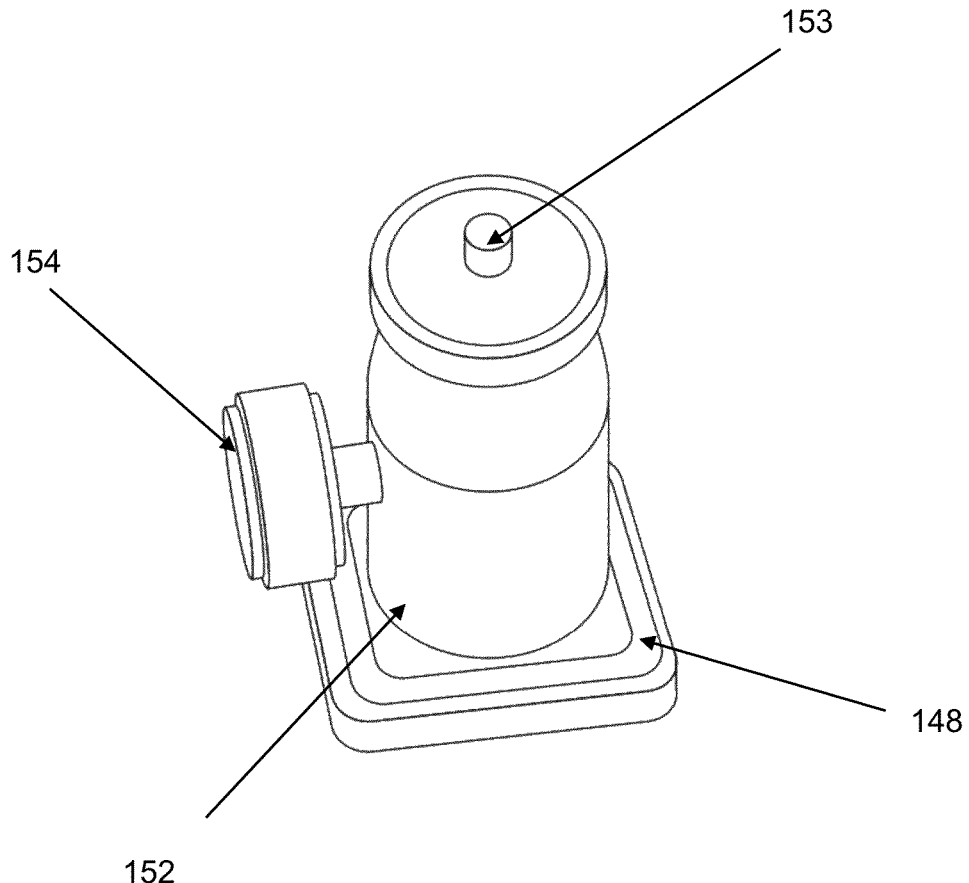
FIG. 25 is a front perspective view of the tripod ball.

FIG. 25 shows ball tripod head 152 which allows any item attached to ball connector 153 to be rotated 360 degrees. This ball connector 153 combined with the adjustments on the tripods and sliders allow the cameras to be configured in any possible direction. Locking and unlocking of rotation occurs with lock knob 154. In the unlocked position, the ball tripod head 152 may rotate around its vertical axis. In the locked position, the ball tripod head 152 is locked in position. Connector plate 148 couples with tripod shoe 106 for easy attachment at multiple locations in the mobile video studio 100.

Figure 26:
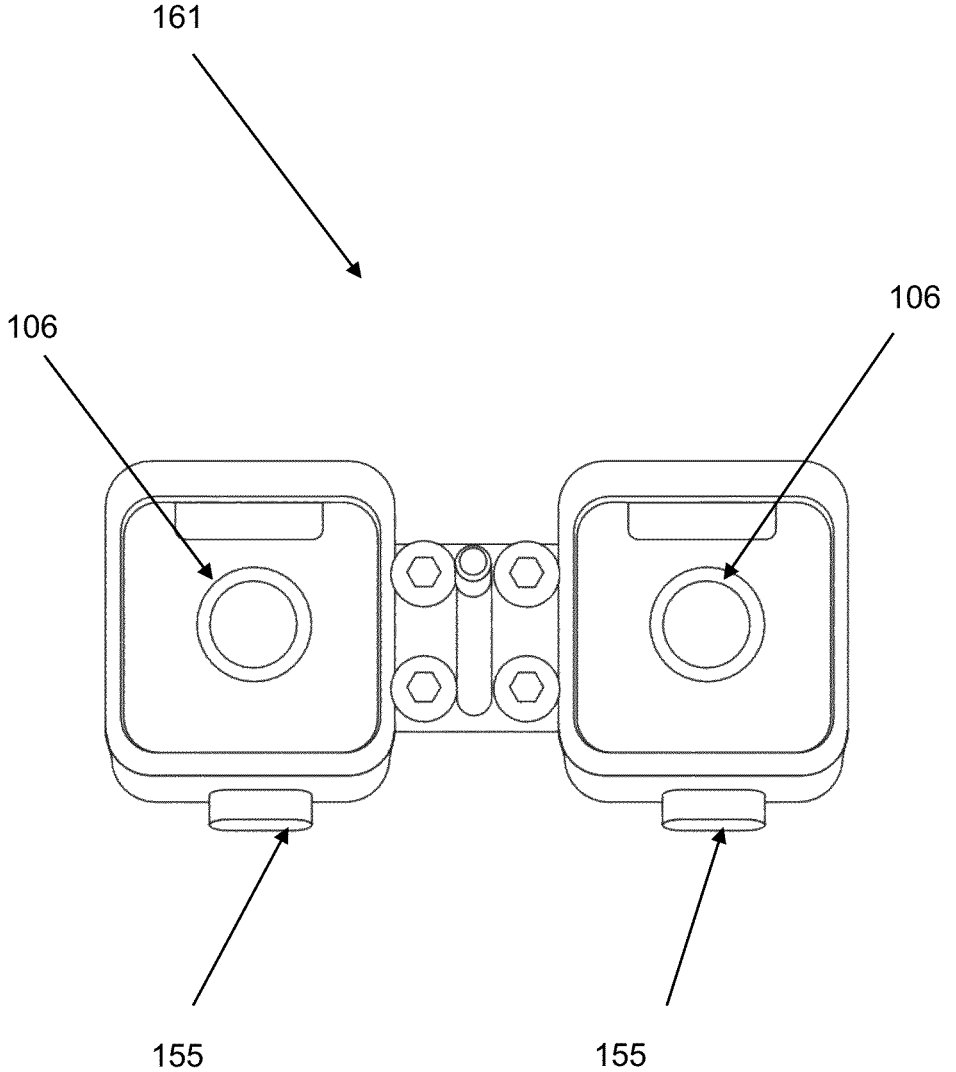
FIG. 26 is a top view of the dual slider plate.

FIG. 26 shows a dual slider plate 161. Dual slider plate is comprised of two tripod shoes 106, each with release button 155. The release button 155, when depressed, releases the item coupled in the tripod shoe 106. The dual slider plate may be used for attaching a ball tripod head 152 with a camera 132 and a tablet 131 or light 125 at the same time.

Figure 27:
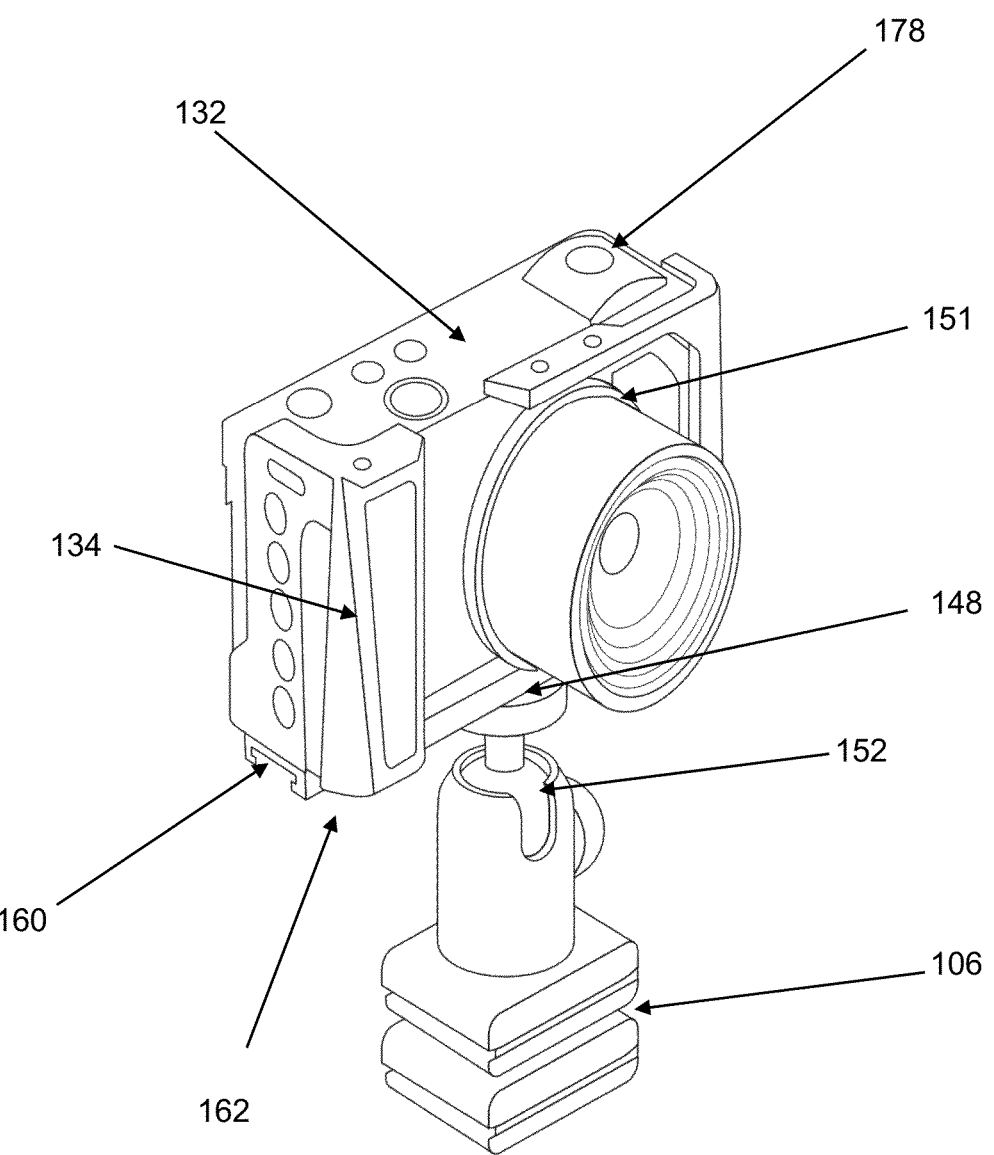
FIG. 27 is a perspective view of the camera cage with a camera installed.

FIG. 27 is a view of camera 132 installed in camera cage 134. Here camera lens is positioned through lens opening 151. Screw post 148 is coupled with the similarly sized and opposite threaded hole in the base of the camera. This screw post 148 couples with this opening and is secured by tightening, holds the camera within camera cage 134. Screw post 148 is located at the top of ball tripod head 152. Ball tripod head is secured in tripod shoe 106. First cage shoe 160 is visible and the location of cage receiver 162 is seen though it is not visible in this view. Level 178 is also visible in this view.

Figure 28:
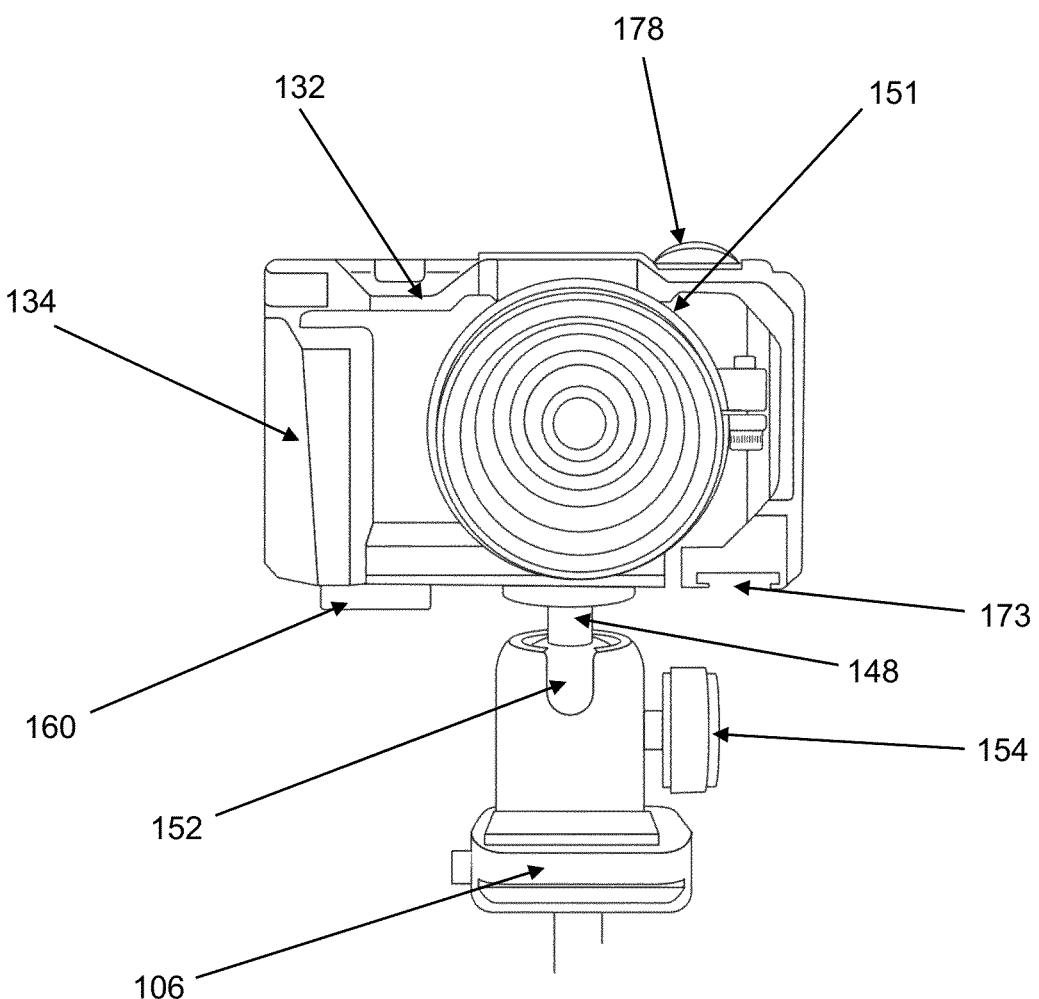
FIG. 28 is a front view of the camera cage with a camera installed.

FIG. 28 is a front view of camera 132 installed in camera cage 134. In addition to the features shown in previous figures, second cage shoe 173 is shown. This second cage shoe may be used to couple various items to the camera cage 134, including cage receiver 162. Level 178 is also visible in this view.

Figure 29:
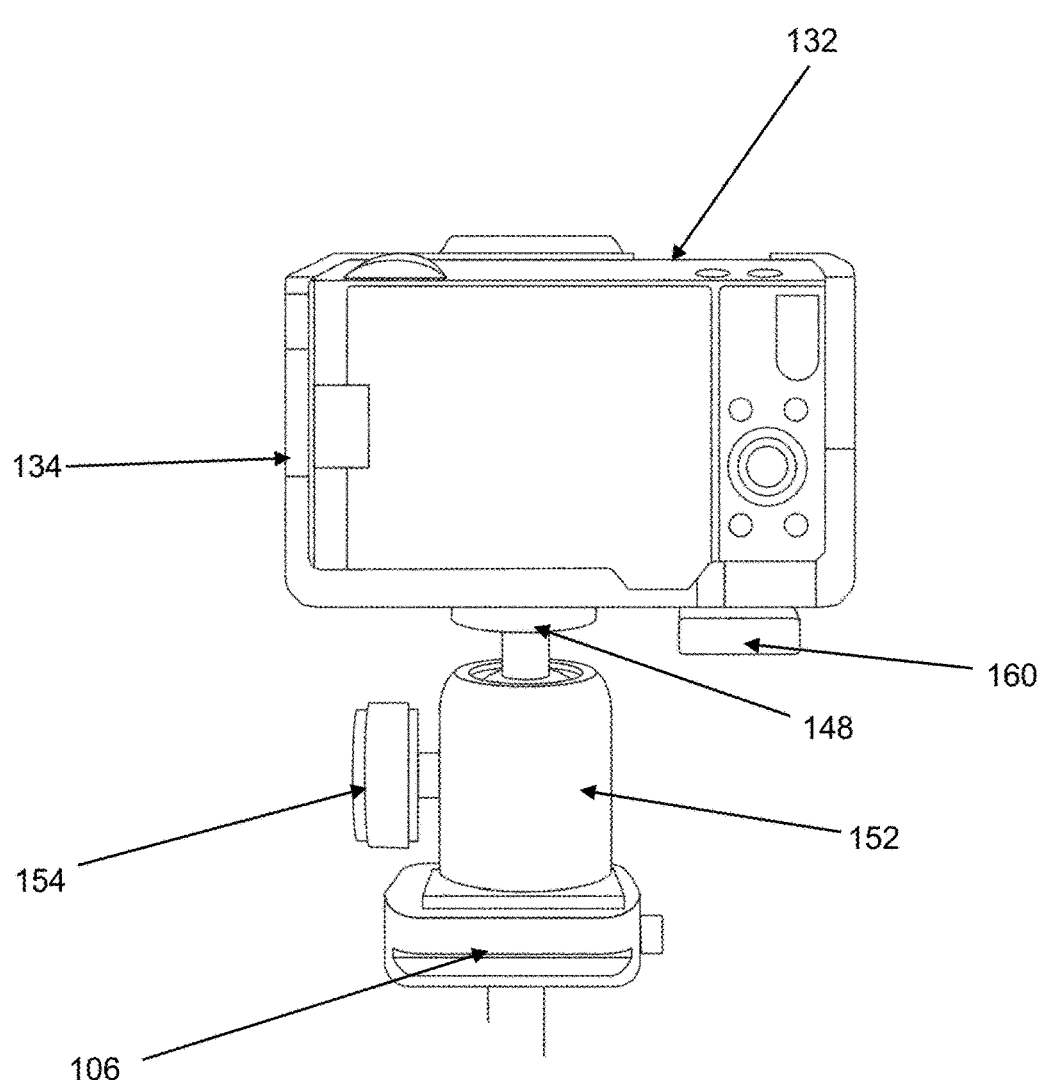
FIG. 29 is a rear view of the camera cage with a camera installed.

FIG. 29 is a rear view of camera 132 installed in camera cage 134. In this view, first cage shoe 160 is visible, as are ball tripod head 152 and tripod shoe 106.

Figure 30:
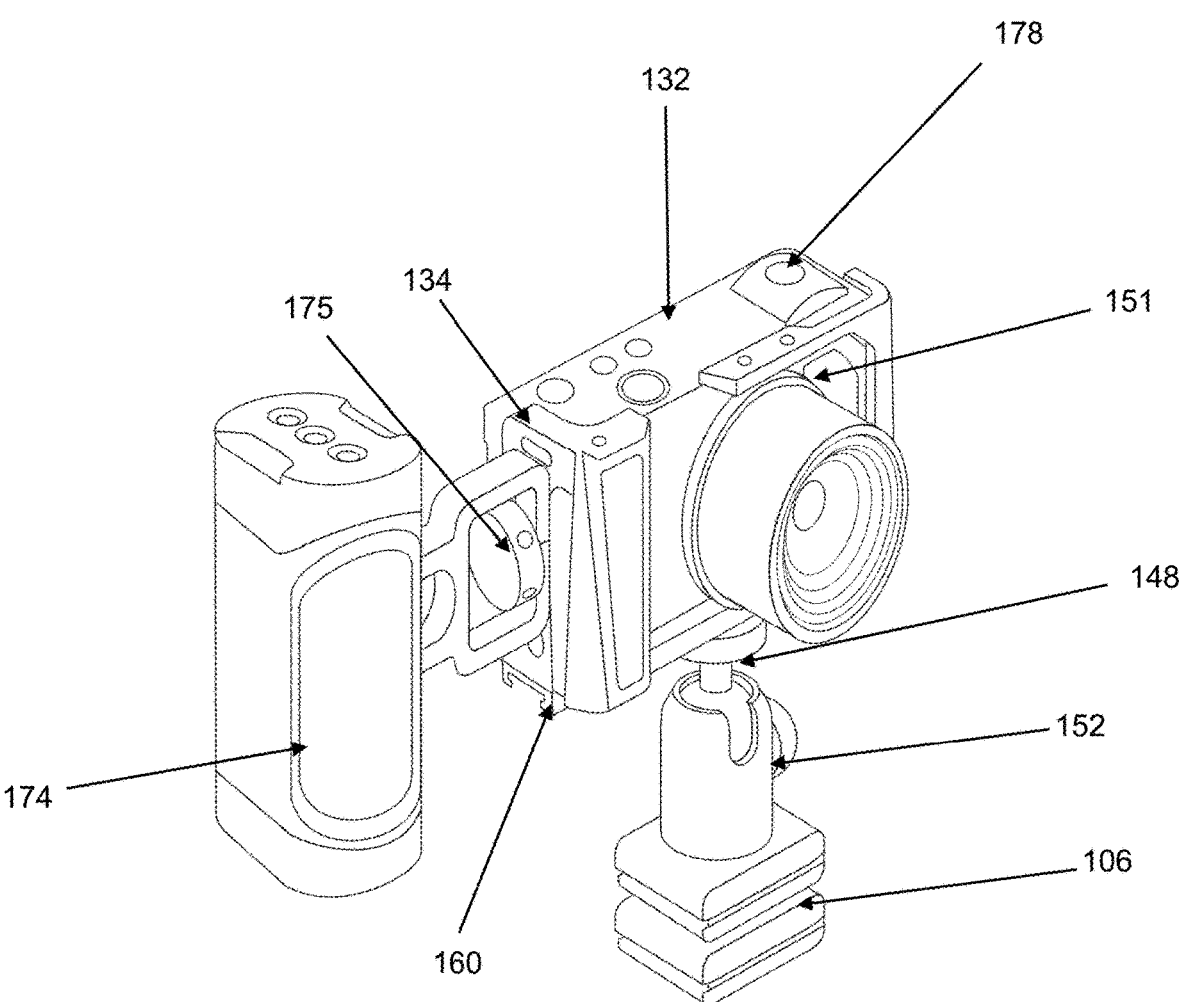
FIG. 30 is a perspective view of the camera cage with a camera and grip installed.

FIG. 30 is a perspective view of camera 132 installed in camera cage 134 with the optional grip 174 installed. Grip 174 is coupled to camera cage 134 via grip coupling 175, in this preferred embodiment a screw mount where a threaded screw is coupled with a similarly sized but opposite threaded hole on camera cage 134. Grip 174 allows for easier handling of the camera 132 when mounted to tripod or when used without a tripod, i.e. hand-held. Also seen in this view are lens opening 151, screw post 148, ball tripod head 152 secured in tripod shoe 106, and first cage shoe 160. In the preferred embodiment, grip 174 is formed of plastic with rubber pad located on the portions that a user would grip with their hand, but any suitable material well known in the art may be utilized.

Figure 31:
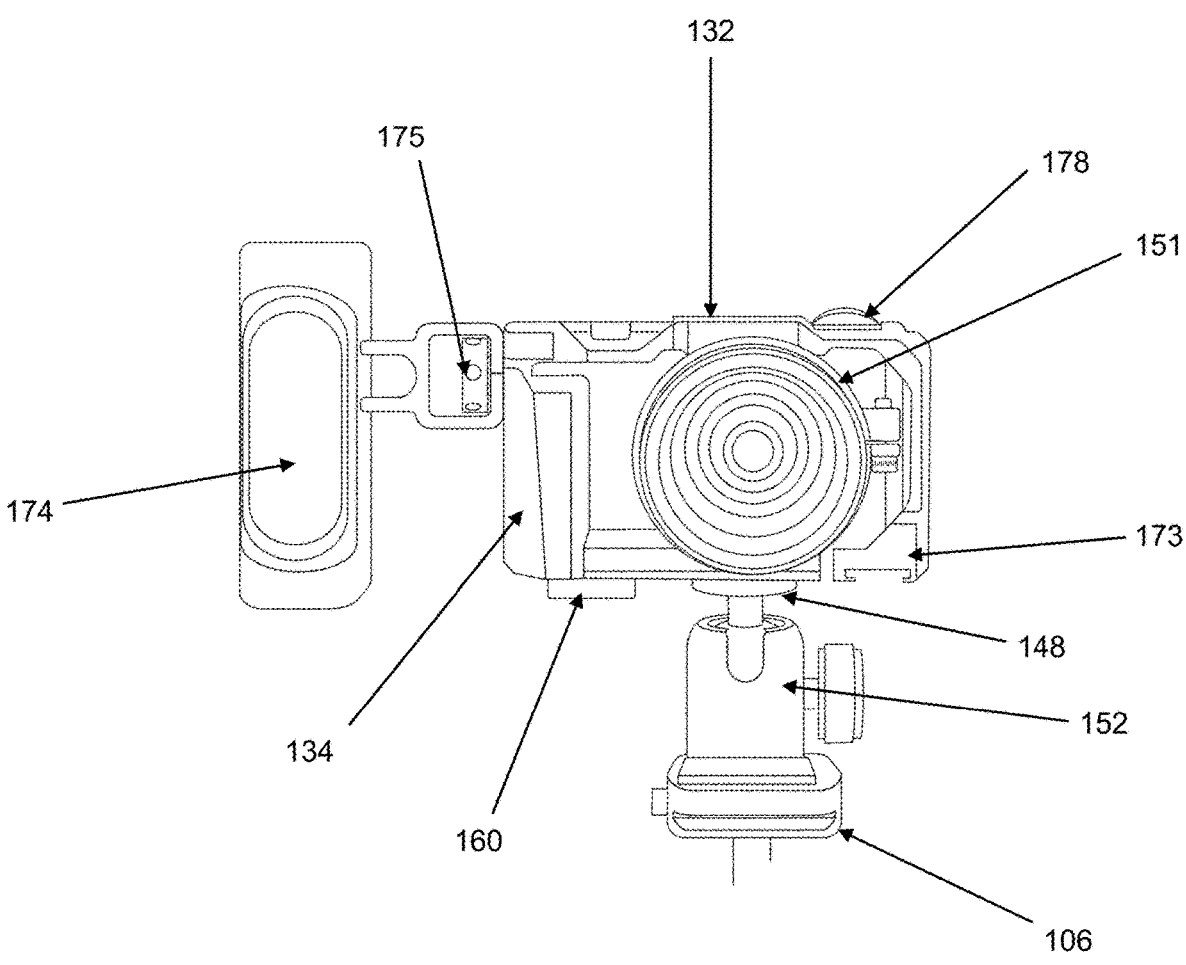
FIG. 31 is a front view of the camera cage with a camera and grip installed.

FIG. 31 is a front view of camera 132 installed in camera cage 134 with the optional grip 174 installed. A side view of grip coupling 175 is visible and couples grip 174 to camera cage 134. Second cage show 173 is visible in this view as well. The remainder of the features shown in this view are as described in relation to prior figures.

Figure 32:
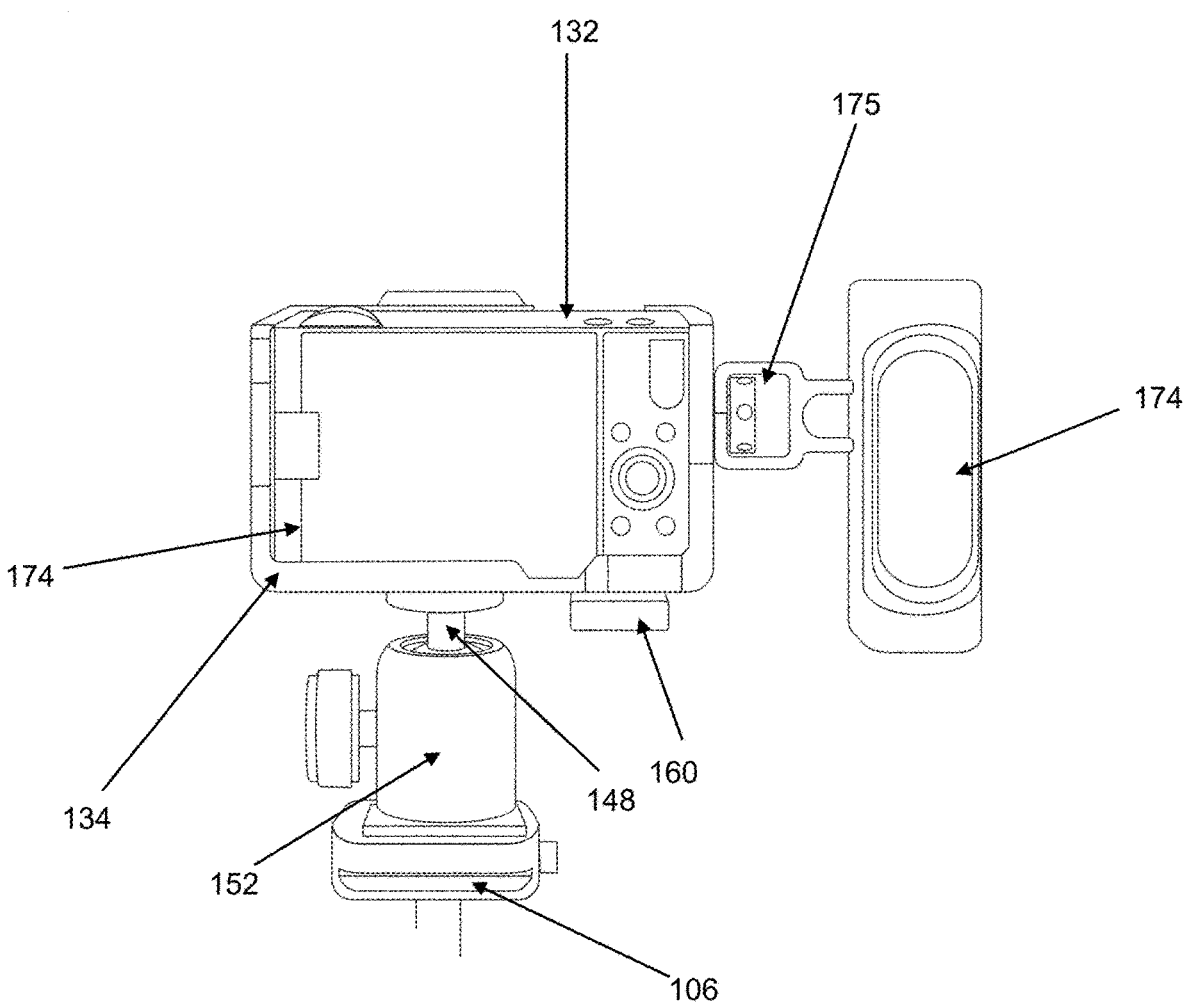
FIG. 32 is a rear view of the camera cage with a camera and grip installed.

FIG. 32 is a rear view of camera 132 installed in camera cage 134 with the optional grip 174 installed. A side, rear view of grip coupling 175 is also shown in this view.

Figure 33:
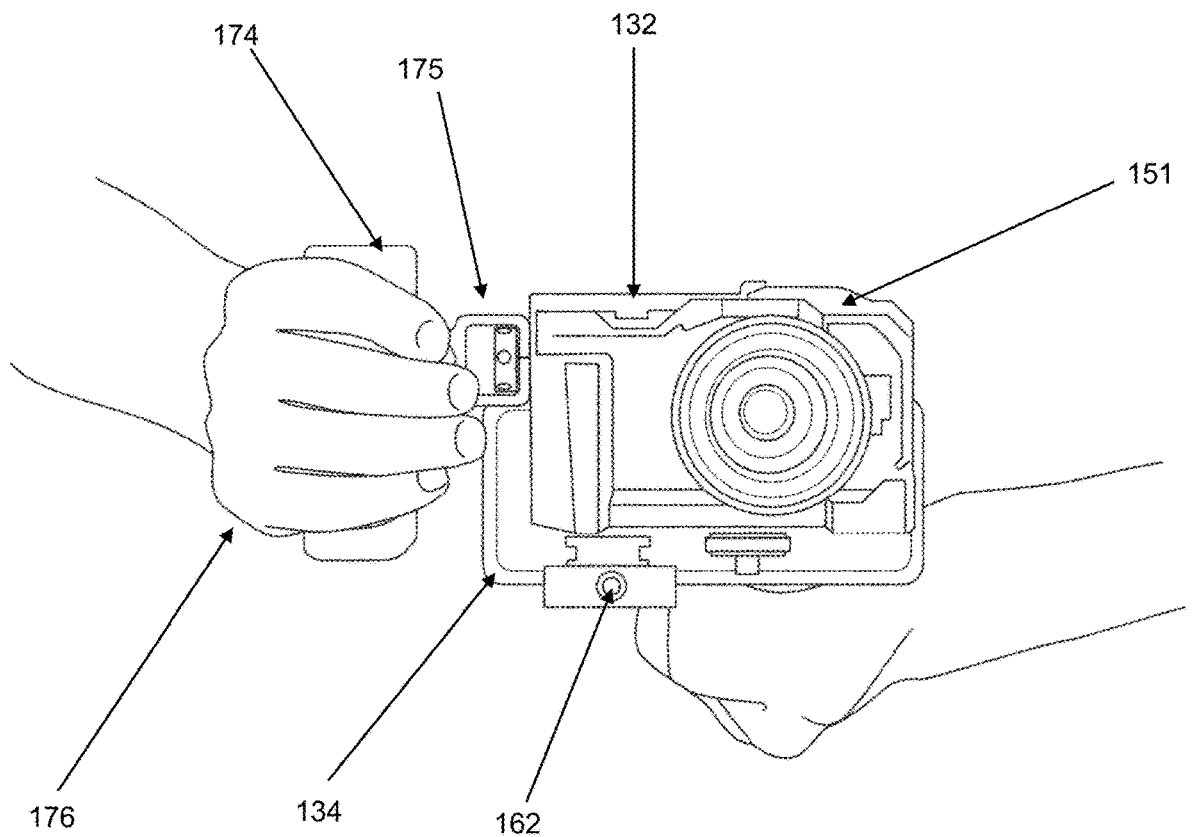
FIG. 33 is a front view of the camera cage with a camera and grip installed being held by a user.

FIG. 33 is a front view of camera 132 installed in camera cage 134 with user hand 176 holding the combination with grip 174. Also visible in this view is cage receiver 162.

Figure 34:
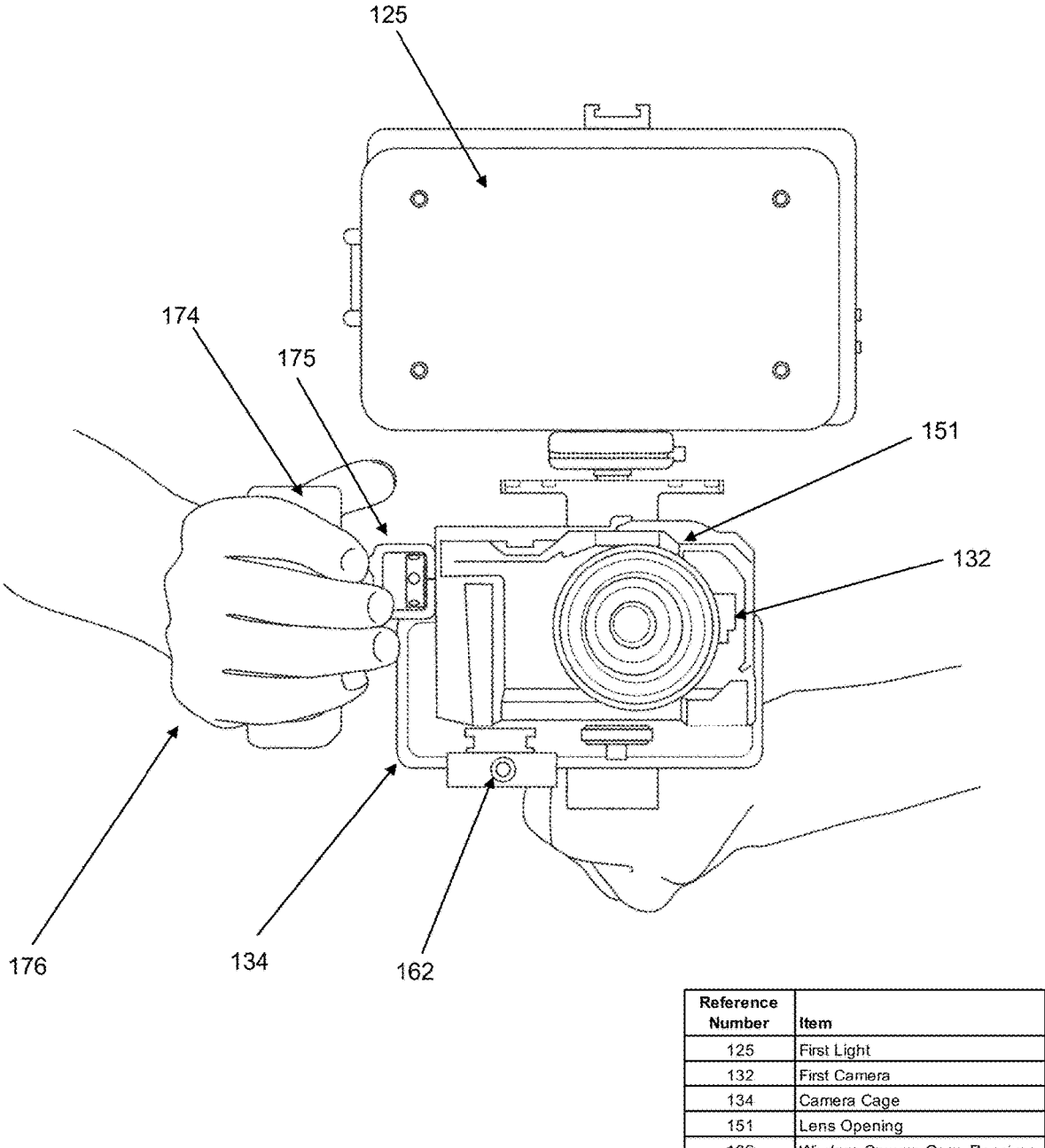
FIG. 34 is a front view of the camera cage with a camera, grip and light installed being held by a user.

FIG. 34 is a front view of camera 132 installed in camera cage 134 with user hand 176 holding the combination with grip 174. Also visible in this view is light 125.

Figure 35:
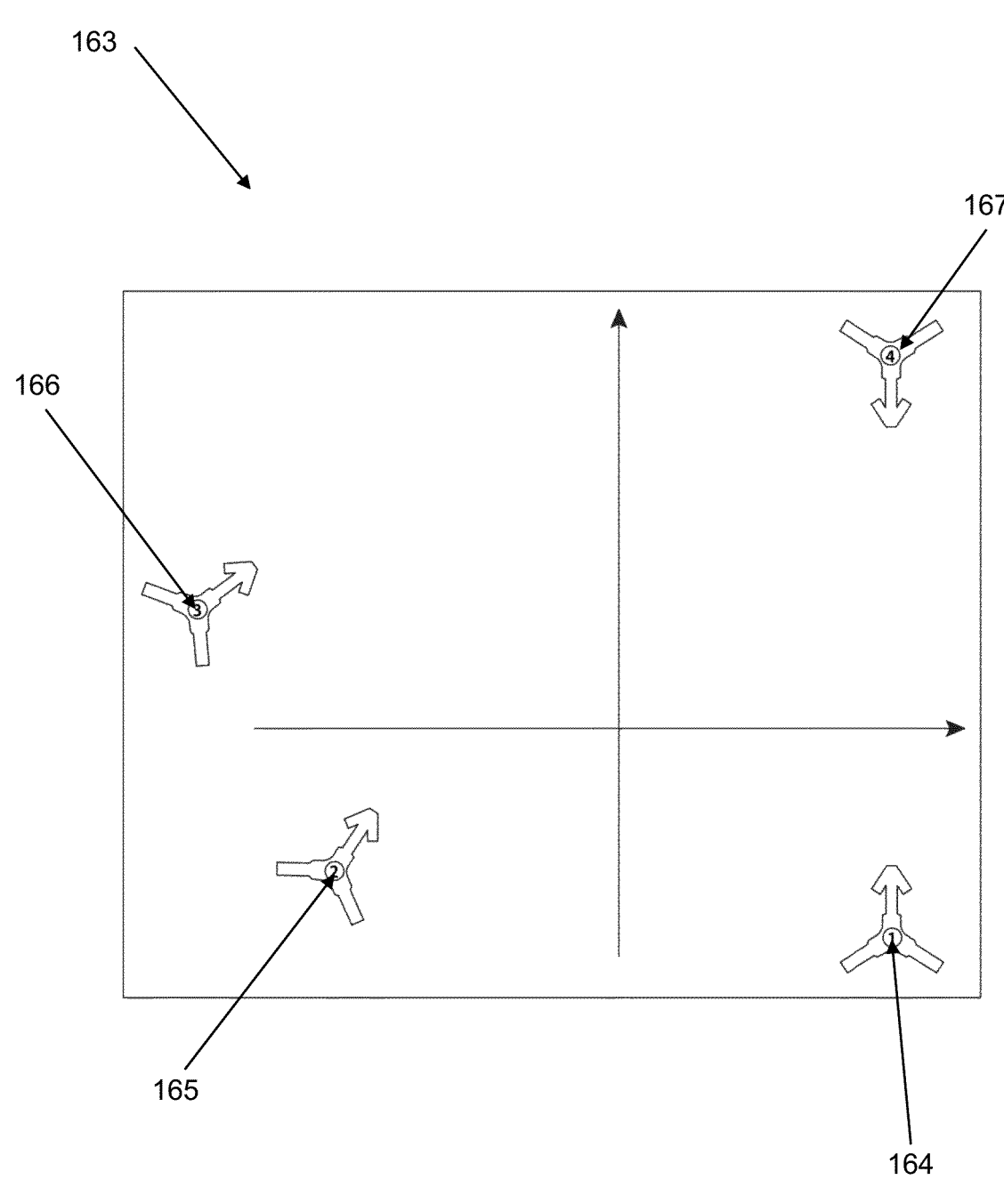
FIG. 35 is a top view of the floor grid.

FIG. 35 shows floor grid 163 of mobile video studio 100. Floor grid 163 functions as a map of the various components of the mobile video studio 100 that is placed on the floor by the receiver of the studio. The floor grid has arrows printed on it, depicting where to place the camera kits, lights, and where the participant should stand. In this embodiment, floor grid 163 includes first position 164, second position 165, third position 166 and fourth position 167. Each of first position 164, second position 165, third position 166 and fourth position 167 may be utilized as a location for a camera kit, a light and/or the participant/presenter. Positions 164-167 can be adjusted to suit the desired camera setup of the participant. The equipment to be located at each position will be outlined to the presenter/participant/user of the mobile video studio 100 to provide them with a map that allows simpler setup of the various components. In this embodiment, there are four positions and the floor grid has dimensions 73" (186 cm)×60" (153 cm) but custom floor grids may be created. Custom floor grids may be designed, printed, and tested for various equipment setups and camera "points of view" before being shipped with the mobile video studio 100. This enables consistent parameters and specifi-cations that can then be easily replicated by the remote user. The specifications and parameters relate primarily to physi-cal distance between the camera kits and participants/pre-senters being recorded, but any specification or parameter that relates to the equipment, participant, presenter, and/or user of the mobile video studio 100 may be used.

Figure 36:
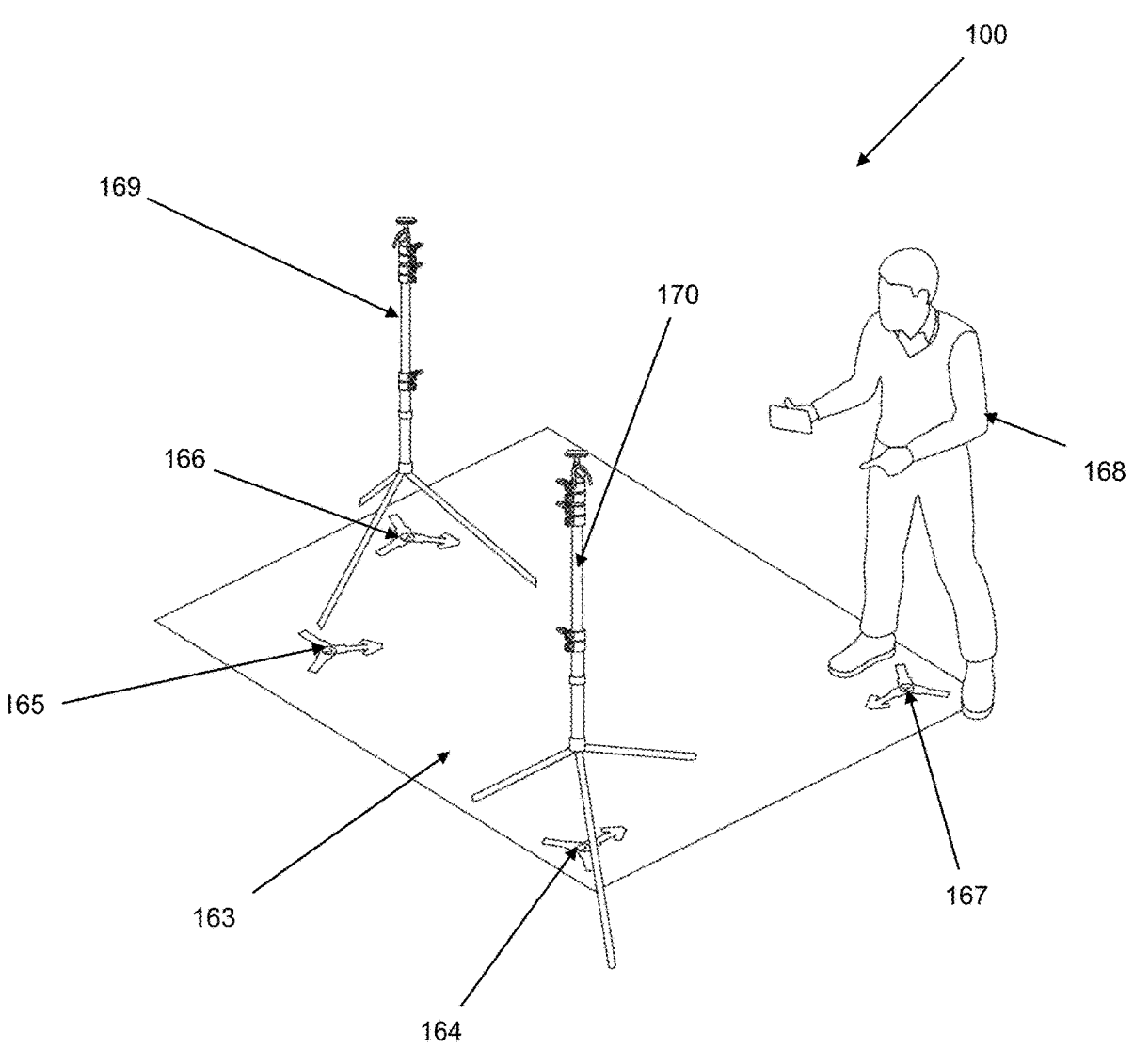
FIG. 36 is a perspective view of the floor grid with two tripods and a presenter.

FIG. 36 is a view of mobile video studio 100 with floor grid 163 in place. In this view, a first tripod 169 is in place in first position 164, a second tripod 170 is in place in third position 166 and a presenter 168 is in fourth position 167. This is just one example configuration and equipment for mobile studio 100 and participants is possible within the claims of the invention.

Figure 37:
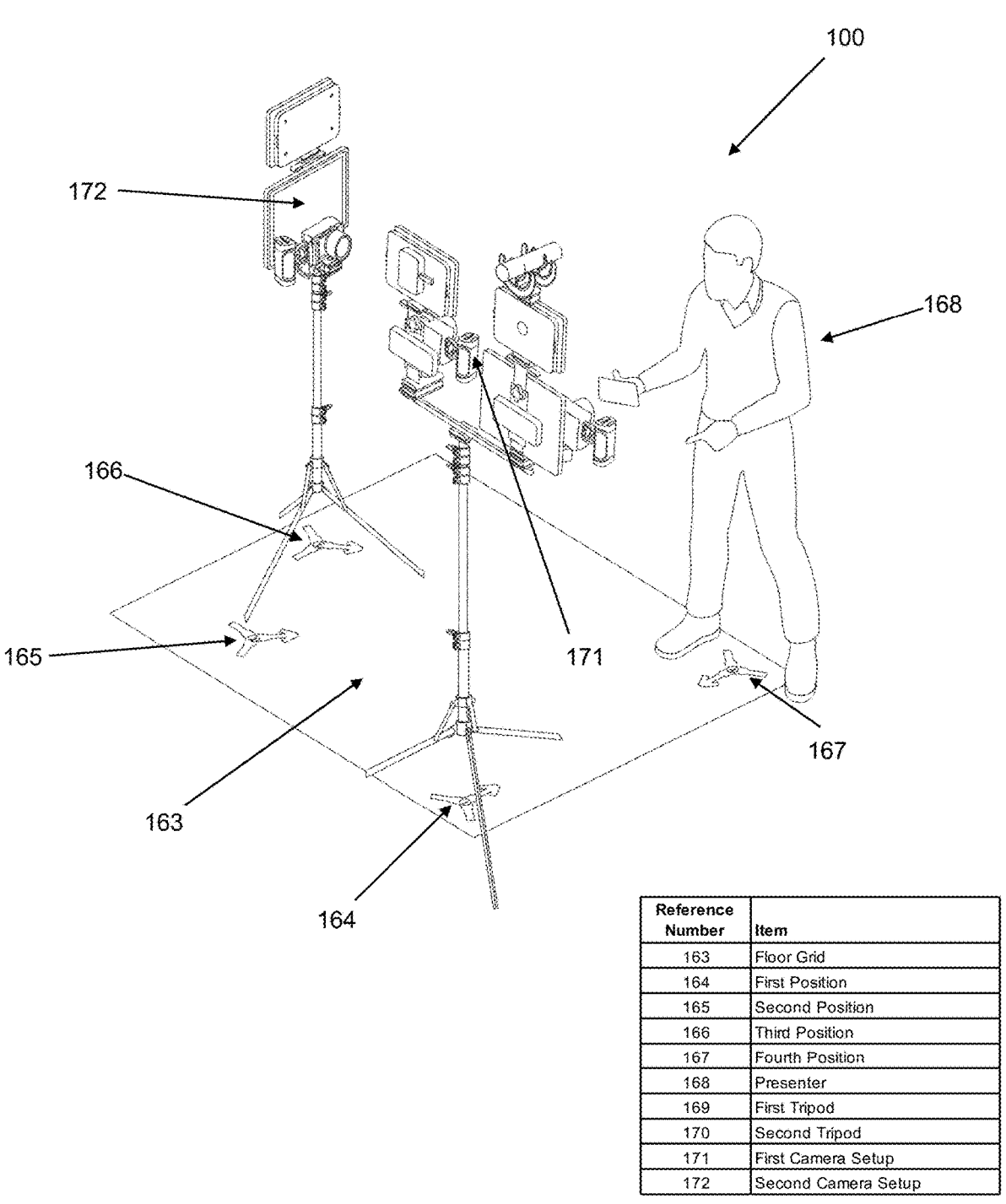
FIG. 37 is a perspective view of the floor grid with two camera setups and a presenter.

FIG. 37 is a view of mobile video studio 100 with floor grid 163 in place. In this view, a first camera setup 171 is in place in first position 164, a second camera setup 172 is in place in third position 166 and a presenter 168 is in fourth position 167. This is just one example configuration and equipment for mobile studio 100 and participants is possible within the claims of the invention.

Although the present invention has been described in relation to the above disclosed preferred embodiment, many modifications in design, implementation, systems and execution are possible while still maintaining the novel features and advantages of the invention. The preferred embodiment is not meant to limit the scope of the patent in any way, and it should be given the broadest possible interpretation consistent with the language of the disclosure on the whole.

The invention claimed is:

1. A mobile video studio comprising:

an extendable base support structure;

an accessory bracket coupled to the base support struc-ture;

a mobile computing device secured to the accessory bracket, where the mobile computing device further comprises a display screen and where the display screen is oriented toward a user of the mobile video studio;

one or more cameras coupled to the mobile video studio, where each camera comprises a base surface and a side surface;

one or more camera cages, each camera cage comprising a base support structure, a side support structure and one or more cage connectors, where each camera is secured within the camera cage by being coupled to the base support structure and where the side support structure extends along the side surface of the camera, and where each camera cage is secured to the accessory bracket;

a network connection device coupled to the mobile video studio;

one or more light modules coupled to the mobile video studio;

one or more batteries coupled to the mobile video studio; and one or more microphones coupled to the mobile video studio.

2. The mobile video studio of claim 1 where the mobile computing device is selected from the group comprising computer, notebook computer, tablet and mobile phone.

3. The mobile video studio of claim 1 further comprising a speaker.

4. The mobile video studio of claim 1 where the one or more cameras, the one or more light modules and the one or more microphones are coupled to the mobile video studio with one or more coupling devices.

5. The mobile video studio of claim 4 where the one or more coupling devices are coupled to the accessory bracket.

6. The mobile video studio of claim 4 where the one or more coupling devices are quick release shoe type devices.

7. The mobile video studio of claim 1 where the base support structure is a tripod.

8. The mobile video studio of claim 1 where the one or more cage connectors are quick release shoe type devices.

9. The mobile video studio of claim 1 where the one or more lighting devices include a diffuser.

10. The mobile video studio of claim 1 where the one or more batteries are coupled to the mobile video studio with a battery bracket.

11. The mobile video studio of claim 1 where the one or more cameras are installed on heads wherein the head rotates.

12. The mobile video studio of claim 1 that further comprises a carrying case for the mobile video studio.

13. The mobile video studio of claim 1 that further comprises a floor grid comprising one more markings to indicate an intended location of the mobile video studio.

14. The mobile video studio of claim 1 where the one or more batteries is a dummy battery.

15. The mobile video studio of claim 1 where the one or more cameras comprises an output and the output is routed to the mobile computing device.

16. The mobile video studio of claim 1 where the one or more cameras comprises an output and the output is routed to a video capture card.

17. The mobile video studio of claim 7 where the camera cage further comprises a grip.

18. A mobile video studio comprising:

an extendable base support structure;

a horizontal support structure coupled to the base support structure with a first end and a second end;

a first accessory bracket coupled to the first end of the horizontal support structure, the first accessory bracket further comprising one or more coupling locations for one or more light modules and one or more cameras, where each camera comprises a base surface and a side surface;

a second accessory bracket coupled to the second end of the horizontal support structure, the second accessory bracket further comprising one or more coupling locations for one or more light modules and one or more cameras, where each camera comprises a base surface and a side surface;

at least one mobile computing device coupled to the first accessory bracket or the second accessory bracket, where the mobile computing device further comprises a display screen and where the display screen is oriented toward a user of the mobile video studio;

one or more camera cages, each camera cage comprising a base support structure, a side support structure and one or more cage connectors, where each camera is secured within the camera cage by being coupled to the base support structure and where the side support structure extends along the side surface of the camera, a network connection device coupled to the mobile video studio;

one or more batteries coupled to the mobile video studio; and one or more microphones coupled to the mobile video studio.

19. The mobile video studio of claim 18 further comprising a speaker.

20. The mobile video studio of claim 18 where the one or more cameras, the one or more light modules and the one or more microphones are coupled to the mobile video studio with one or more coupling devices.

21. The mobile video studio of claim 20 where the one or more coupling devices are quick release shoe type devices.

22. The mobile video studio of claim 18 where the base support structure is a tripod.

23. The mobile video studio of claim 18 where the one or more cage connectors are quick release shoe type devices.

24. The mobile video studio of claim 18 where the one or more lighting devices include a diffuser.

25. The mobile video studio of claim 18 where the one or more batteries are coupled to the mobile video studio with a battery bracket.

26. The mobile video studio of claim 18 where the one or more cameras are installed on heads wherein the head rotates.

27. The mobile video studio of claim 18 that further comprises a carrying case for the mobile video studio.

28. The mobile video studio of claim 18 that further comprises a floor grid comprising one more markings to indicate an intended location of the mobile video studio.

29. The mobile video studio of claim 23 where the camera cage further comprises a grip.

30. The mobile video studio of claim 18 where the one or more batteries is a dummy battery.

31. The mobile video studio of claim 18 where the one or more cameras comprises an output and the output is routed to the mobile computing device.

32. The mobile video studio of claim 18 where the one or more cameras comprises an output and the output is routed to a video capture card.

33. The mobile video studio of claim 1 where a device selected from the group comprising lights, batteries, mobile computing devices and microphones is coupled to the cage connector.

34. The mobile video studio of claim 18 where a device selected from the group comprising lights, batteries, mobile computing devices and microphones is coupled to the cage connector.

35. The mobile video studio of claim 18 where the mobile computing device is selected from the group comprising computer, notebook computer, tablet and mobile phone.

\* \* \* \* \*